US012602895B2

(12) United States Patent
 Kaza et al.

(10) Patent No.: US 12,602,895 B2
(45) Date of Patent: *Apr. 14, 2026

(54) MACHINE LEARNING-BASED DOCUMENT SPLITTING AND LABELING IN AN ELECTRONIC DOCUMENT SYSTEM

(71) Applicant: DocuSign, Inc., San Francisco, CA (US)

(72) Inventors: Shrinivas Kiran Kaza, Fremont, CA (US); Taiwo Raphael Alabi, Boise, ID (US); Ashwath Mohan, San Ramon, CA (US); Varsha Sri Raghavan, Fremont, CA (US); Kim Cuong Phung, Dublin, CA (US)

(73) Assignee: Docusign, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,644

(22) Filed: Jun. 25, 2024

(65) Prior Publication Data

US 2024/0346795 A1 Oct. 17, 2024

Related U.S. Application Data

(63) Continuation of application No. 17/354,883, filed on Jun. 22, 2021, now Pat. No. 12,046,011.

(51) Int. Cl.
 *G06V 10/22* (2022.01)
 *G06N 20/20* (2019.01)
 *G06V 30/416* (2022.01)

(52) U.S. Cl.
 CPC .......... *G06V 10/225* (2022.01); *G06N 20/20* (2019.01); *G06V 30/416* (2022.01)

(58) Field of Classification Search
 None
 See application file for complete search history.

(56) References Cited

U.S. PATENT DOCUMENTS

| | | | | |
|---|---|---|---|---|
| 11,562,593 | B2 * | 1/2023 | Li | G06F 18/21 |
| 12,159,105 | B2 * | 12/2024 | Singh Bawa | G06N 20/00 |
| 2009/0116755 | A1 * | 5/2009 | Neogi | G06V 30/1985 |
| | | | | 382/224 |
| 2009/0235082 | A1 * | 9/2009 | Garrett | H04L 9/3231 |
| | | | | 713/176 |

(Continued)

*Primary Examiner* — Delomia L Gilliard
(74) *Attorney, Agent, or Firm* — KDW FIRM PLLC

(57) ABSTRACT

An electronic document system can allow users to upload a document package containing multiple individual component documents. Each component document includes a subset of a plurality of pages that are included in the document package. The electronic document system identifies a page of each component document by applying a machine learning model to the document package. The electronic document system partitions the document package into the individual component documents based on the identified pages. For each individual component document, the electronic document system identifies a document topic corresponding to the component document by applying another machine learning model. The electronic document system modifies a user interface to display each component document and corresponding document topic.

17 Claims, 14 Drawing Sheets

(56)　　　　　　　References Cited

U.S. PATENT DOCUMENTS

| 2016/0034757 | A1* | 2/2016 | Chhichhia | ............... G06F 16/35 |
| | | | | 382/206 |
| 2016/0203209 | A1* | 7/2016 | Clinchant | ............. G06F 16/353 |
| | | | | 707/738 |
| 2017/0357909 | A1* | 12/2017 | Willamowski | ......... G06N 20/00 |
| 2018/0300315 | A1* | 10/2018 | Leal | ...................... G06F 40/268 |
| 2019/0251172 | A1* | 8/2019 | Jezewski | ................. G06N 20/20 |
| 2022/0058496 | A1* | 2/2022 | Rusk | ........................ G06N 5/04 |
| 2022/0237373 | A1* | 7/2022 | Singh Bawa | .......... G06N 20/00 |
| 2022/0309276 | A1* | 9/2022 | Kumar | ................ G06F 18/2431 |
| 2022/0398284 | A1* | 12/2022 | Singh | ................... G06F 40/174 |
| 2024/0420497 | A1* | 12/2024 | Reddy | ................. G06V 30/414 |

* cited by examiner

300

Text Characteristic 620A

Text Characteristic 620B

Character 610A

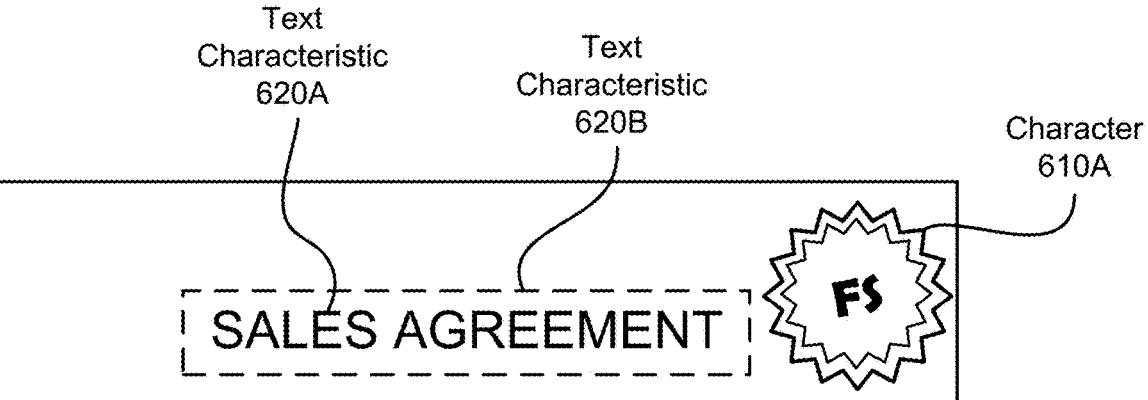

SALES AGREEMENT

This Sales Agreement is for the purchase of engineering consulting services between Fresh Soft ("Fresh Software") and Customer Inc. ("Customer"). Fresh Software hereby agrees to provide engineering consulting services to Customer.  The parties hereby agree to the foregoing and as follows:

Customer agrees to pay Fresh Software, each month, beginning 05/01/2021 and ending 10/31/2021, a fixed sum of $2,000.  The fixed sum due and payable on the 1$^{st}$ day of each month.

Upon expiration, this Sales Agreement shall expire AUTOMATICALLY, UNLESS either Customer or Fresh Software notify the other party in writing at least 30 days prior to expiration that they do not wish this Sales Agreement to expire.

Character 610B

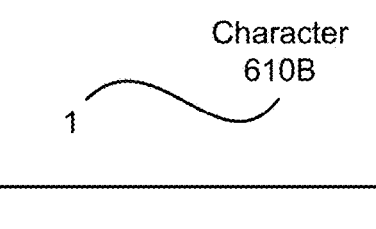

1

Page 600

FIG. 6A

Text Identifier
625A

Text Identifier
625B

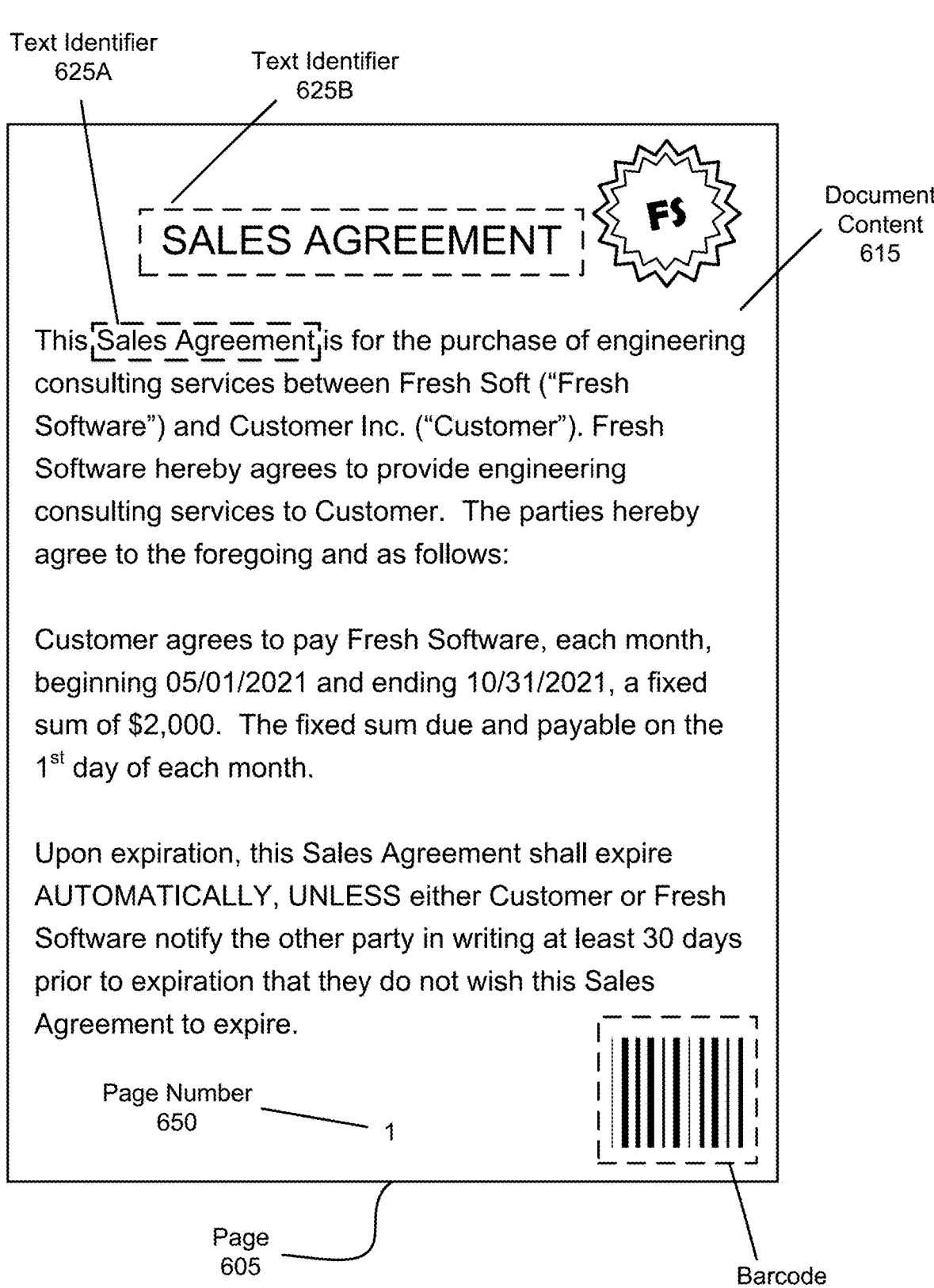

Document
Content
615

SALES AGREEMENT

FS

This Sales Agreement is for the purchase of engineering consulting services between Fresh Soft ("Fresh Software") and Customer Inc. ("Customer"). Fresh Software hereby agrees to provide engineering consulting services to Customer. The parties hereby agree to the foregoing and as follows:

Customer agrees to pay Fresh Software, each month, beginning 05/01/2021 and ending 10/31/2021, a fixed sum of $2,000. The fixed sum due and payable on the 1$^{st}$ day of each month.

Upon expiration, this Sales Agreement shall expire AUTOMATICALLY, UNLESS either Customer or Fresh Software notify the other party in writing at least 30 days prior to expiration that they do not wish this Sales Agreement to expire.

Page Number
650

1

Page
605

Barcode
640

MACHINE LEARNING-BASED DOCUMENT SPLITTING AND LABELING IN AN ELECTRONIC DOCUMENT SYSTEM

CROSS REFERENCE TO RELATED APPLICATIONS

This application is a continuation of U.S. application Ser. No. 17/354,883, filed on Jun. 22, 2021, the disclosures of which is incorporated herein by reference in its entirety.

BACKGROUND

This disclosure relates generally to electronic documents and more specifically to recognizing and labeling individual documents within a combined file containing multiple documents.

Many situations can require a user to manage a single file containing multiple individual documents. For example, business or financial transactions can involve a file including a large number of forms which need to be signed and/or otherwise reviewed. Electronic document systems exist which can manage a single file of multiple documents; however, a user reviewing the file may face a tedious manual process of determining where one document ends and another begins in the file and/or what each individual document is primarily about (e.g., what the topic of the document is). Thus, the user may overlook critical details in one or more of the documents in the file.

Splitting a file into its individual component documents is not a trivial task and introduces opportunities for errors in splitting documents and can become time consuming for the user, especially as the number of pages in the file increases. In some cases, a file does not include explicit designations for which component document each individual page of the file is associated with (or for what or how many component documents exist within the document package). A user trying to split the file can be forced to individually review each page of the file to assign pages to appropriate component documents. This can lead to potential errors, such as the user placing one or more pages of the file into an incorrect component document or the user missing an entire component document. Additionally, for the user to have a high-level of understanding regarding what each component document is in regard to (e.g., is the component document consist of policy documents, term sheets, bank forms, etc.), the user would have to skim and/or read some or all of the pages of each component document. With a large file, this can also be time consuming and lead to many errors.

Existing systems, that may be utilized by the user to automatically split a document file into component documents, may be unable to handle the large (e.g., mega-sized) document file containing tens, hundreds, or thousands of individual component documents. These systems would require a huge amount of compute power and time to identify, split, and label the component documents, thus preventing a scalable solution for analyzing the document file quickly and accurately.

SUMMARY

An electronic document system can allow users to upload document packages (also referred to as files), each containing multiple individual component documents (also referred to as document files or documents). Each document package includes a plurality of pages and each component document includes a subset of the plurality of pages. The electronic document system uses an ensemble machine learning model (e.g., more than one machine learning model) to intelligently identify each component document for splitting the document package into each component document and to identify a document topic for each component document. The electronic document system presents the document package to a user by displaying each component document and corresponding document topic, thereby providing the user with an improved experience by increasing navigability and understandability of the document package.

In an example implementation, the ensemble machine learning model may include at least a first machine learning model for identifying each component document of a document package and a second machine learning model for identifying a document topic for each component document. For example, the electronic document system applies the first machine learning model to the document package to identify a page (e.g., a first page and/or a last page) of each individual component document. The electronic document system partitions the document package into the individual component documents based on the identified pages. For each individual component document, the electronic document system applies the second machine learning model to identify a document topic corresponding to the component document. The electronic document system modifies a user interface to display each component document and corresponding document topic.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 6A illustrates a first embodiment of an example page included in a document package.

FIG. 6B illustrates a second embodiment of the example page included in the document package.

Figure 1:
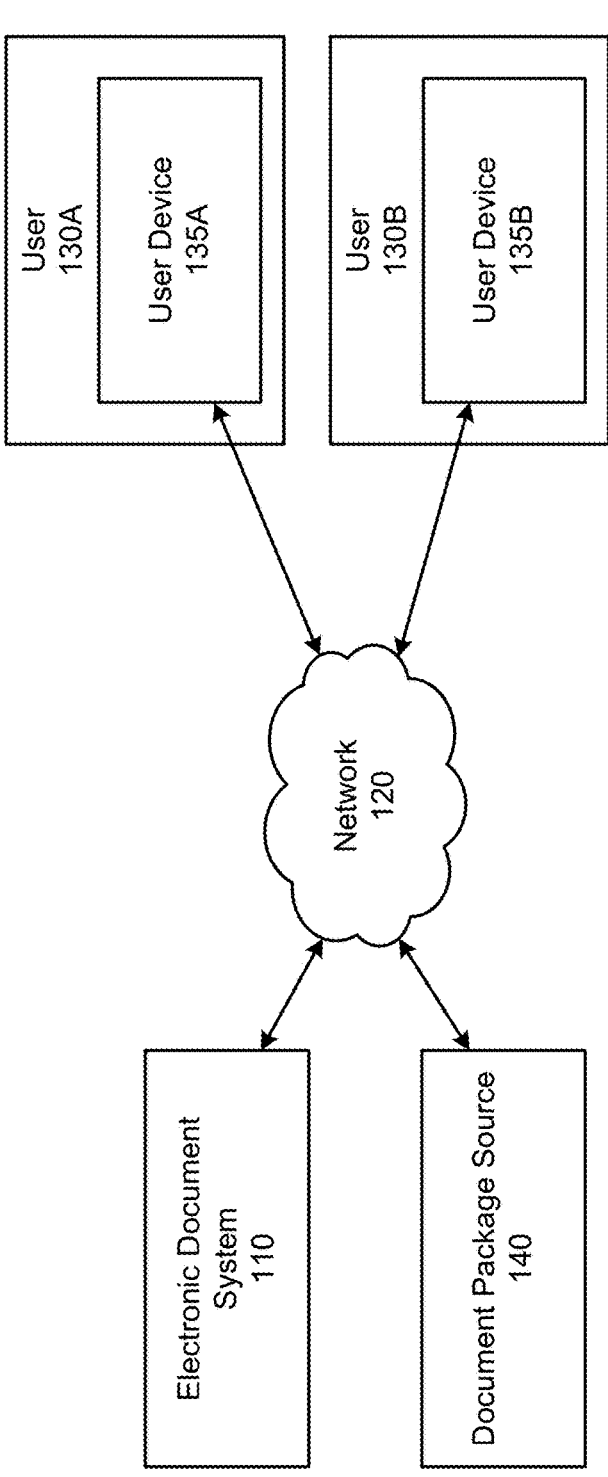
FIG. 1 is a block diagram of a system environment in which an electronic document system operates, according to an example embodiment.

The figures depict various embodiments for purposes of illustration only. One skilled in the art will readily recognize from the following discussion that alternative embodiments of the structures and methods illustrated herein may be employed without departing from the principles described herein.

The figures use like reference numerals to identify like elements. A letter after a reference numeral, such as "130A," indicates the text refers specifically to the element having that particular reference numeral. A reference numeral in the text without a following letter, such as "130," refers to any or all of the elements in the figures bearing that reference numeral (e.g., "130" in the text refers to reference numerals "130A" and "130B" in the figures).

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Overview

A system environment can facilitate the creation, negotiation, execution, and management of documents (e.g., as individual documents or as component documents in a document package) by one or more users of an electronic document system. For example, an electronic document system can allow users to manage, create, edit, review, negotiate and/or sign document packages. A document package is a single file containing multiple individual documents or document files. Within the system environment, the electronic document system can provide a means for a user to import document packages containing multiple different individual documents of document files (also referred to as component documents). The electronic document system can provide a user interface (UI) for a user to review content and/or terms presented in a document package, and in response to agreeing to the content and/or terms, can electronically execute the document package. In some embodiments, the electronic document system may automatically identify and separate the component documents within an uploaded document package. For example, during a negotiation phase and/or during an execution phase of the document package, the electronic document system may partition the document package into individual component documents, identify a document topic for each component document, and display, via the UI, each component document and corresponding document topic to a user.

A document package includes a plurality of pages and each component document within the document package includes a subset of the plurality of pages. In some implementations, the electronic document system utilizes an ensemble machine learning model to identify each component document within the document package. For example, the electronic document system can apply a first machine learning model of the ensemble machine learning model to the document package to identify a page (e.g., a first page) of each component document. Based on the identified page, the electronic document system partitions the document package into the individual component documents. For example, by identifying the first page of each component document, the electronic document system can then determine a set of pages subsequent to each first page for each component document, thereby segmenting (or splitting) the document package into each individual component document. The electronic document system further can identify a document topic corresponding to each individual component document by applying a second machine learning model of the ensemble machine learning model. For example, by applying the second machine learning model to each component document, the electronic document system may identify a document topic for each component document based on frequency of particular words included in each component document.

In some implementations, a structure of a document package may clearly separate the pages and/or metadata associated with one or more component documents (such as in the case of a .zip file of individual document files), but in many cases a document package makes no structural distinction between the pages associated with each component document (such as in the case of a single .pdf file containing multiple consecutive documents). For these document packages, the electronic document system analyzes each document package to identify the component documents and can further analyze each component document to identify a main idea (subject of or topic of) each component document. With the electronic document system performing the analyses and displaying the results to a user, the user will have a better understanding of the various components of the document package.

By utilizing an ensemble machine learning model, the electronic document system is more robust, trainable, and scalable. For example, by having at least two separate machine learning models in the ensemble model, each machine learning model is specifically trained for a task and any errors that may take place in the performance of one of the machine learning models will not propagate to the other model(s). Additionally, each machine learning model in the ensemble machine learning model is sufficiently optimized providing more accurate results when compared to a single machine learning model trained to perform multi-tasks. The ensemble machine learning model can also handle large (e.g., mega-sized) document packages containing tens, hundreds, or thousands of individual component documents.

The system environment described herein can be implemented within a document management system, a centralized document system, an online document system, an electronic document system, or any type of digital management platform. It should be noted that although description may be limited in certain contexts to a particular environment, this is for the purposes of simplicity only, and in practice the principles described herein can apply more broadly to the context of any digital management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

Figure (FIG.) 1 is a block diagram of a system environment in which an electronic document system operates, according an example embodiment. The system environment 100 shown by FIG. 1 includes an electronic document system 110, a network 120, a plurality of users 130 (e.g., a user 130A and a user 130B) each associated with a user device 135 (e.g., a user device 135A and a user device 135B, respectively), and a document package source 140. In alternative configurations, different and/or additional components may be included in the system environment 100.

The electronic document system 110 is a computer system (or group of computer systems) for storing and managing document packages (also referred to as a file) for the plurality of users 130. A document package includes multiple component documents (also referred to as documents or document files). Using the electronic document system 110, the users 130 can collaborate to create, edit, review, negotiate, and/or sign document packages. For example, the electronic document system 110 may enable the negotiation of a real estate document package that includes several component documents (e.g., a sales agreement, a term sheet, a policy sheet, a bank form, or other type of document related to the real estate document package). Similarly, the electronic document system 110 may allow a user 130 (e.g., the user 130B) to manage document packages received or imported from other sources, such as from another user 130 (e.g., the user 130A) or the document package source 140.

As described above, the electronic document system 110 may receive document packages containing multiple undifferentiated component documents which can be split (or partitioned) into individual component documents by the electronic document system 110 when the document packages are added to the electronic document system 110 for management. Each document package includes a plurality of pages and each component document within the document package includes a subset of the plurality of pages. In some implementations, the electronic document system 110 utilizes an ensemble machine learning model to identify each component document in a document package and to identify a document topic for each component document. A document topic describes what a component document is in regard to (e.g., what is the subject of the component document). In some implementations, the electronic document system 110 utilizes a heuristics-based or logic-based methodology for identifying each component document in a document package. The electronic document system 110 presents the document package split into its component documents with corresponding document topics to the user 130 via a user interface (UI) displayed on a user device 135.

The electronic document system 110 may include one or more servers, server groups, server clusters, and/or other suitable computing devices or systems of devices configured to implement the functions of the electronic document system 110. In some implementations, the electronic document system 110 communicates with the user devices 135 over the network 120 to receive instructions and/or document packages for management by the electronic document system 110 and to send document packages (or other information) to users 130 via the user devices 135. The electronic document system 110 may assign varying permissions controlling which document packages and/or component documents a user 130 can interact with (and what actions the user 130 can take on those document packages and/or component documents). The electronic document system 110 will be discussed in further detail with respect to FIG. 2.

The network 120 transmits data with the system environment 100. The network 120 may comprise any combination of local area and/or wide area networks, using both wired and/or wireless communication systems, such as the Internet. In some embodiments, the network 120 transmits data over a single connection (e.g., a data component of a cellular signal, or Wi-Fi, among others), and/or over multiple connections. In some embodiments, the network 120 uses standard communications technologies and/or protocols. For example, the network 120 includes communication links using technologies such as Ethernet, 802.11, 3G, 4G, code division multiple access (CDMA), digital subscriber line (DSL), and the like. Data exchanged over the network 120 may be represented using any suitable format, such as hypertext markup language (HTML) or extensible markup language (XML). In some embodiments, the network 120 may include encryption capabilities to ensure the security of customer data. For example, encryption technologies may include secure sockets layers (SSL), transport layer security (TLS), virtual private networks (VPNs), and Internet Protocol security (IPsec), among others.

Through the network 120, the electronic document system 110 can communicate with the user devices 135 associated with the users 130. A user 130 may be an individual, an organization, an entity, a group, a company, an account, etc. Each user 130A, 130B can interact with document packages and/or component documents (or other content) generated on and/or managed by the electronic document system 110. Each user 130 can be associated with a username, email address, user account, or other identifier that can be used by the electronic document system 110 to identify the user 130 and to control the ability of the user 130 to view, modify, or otherwise interact with document packages and/or component documents managed by the electronic document system 110. In an example implementation, the user 130A can interact with the electronic document system 110 through their user account with the electronic document system 110 and the user device 135A accessible to that user 130A.

Each user device 135 is a computing device capable of receiving user input (e.g., from a user 130) as well as transmitting data to and/or receiving data from the electronic document system 110 via the network 120. For example, a user device 135 can be a desktop or a laptop computer, a smartphone, tablet, or another suitable device. User devices 135 may be configured to communicate via the network 120 (e.g., with the electronic document system 110). In one embodiment, a user device 135 executes an application allowing a user of the user device 135 to interact with the electronic document system 110. For example, a user device 135 can execute a browser application to enable interaction between the user device 135 and the electronic document system 110 via the network 120. In some embodiments, a single user can be associated with multiple user devices 135 and/or one user device 135 can be shared between multiple users who may, for example, log into a personal account on the user device 135 to access the electronic document system 110.

A document package source 140 is a computing device (such as a server or a user device 135) that submits a document package to the electronic document system 110 for management. In some implementations, the document package source 140 submits the document package to the electronic document system 110 automatically (for example, through an automated system of a company) or based on certain conditions being met. For example, a company (such as a bank or financial institution) can prepare a document package for a user 130 to review and sign which is automatically forwarded to the electronic document system 110 (for example, based on the company's previous instructions to the document package source 140). In other cases, the electronic document system 110 may receive manually submitted document packages. For example, a user 130A can receive (or create) a document package that they wish to upload to the electronic document system 110 for management and manually upload the document package to the electronic document system 110 using their associated user device 135A. Similarly, a document package source 140 can submit a specific document package to the electronic document system 110 at the request of a user 130. For example, a user 130A may set the electronic document system 110 as the location they wish the document package source 140 to send a document package associated with the user 130A.

Example Electronic Document System Architecture

Figure 2:
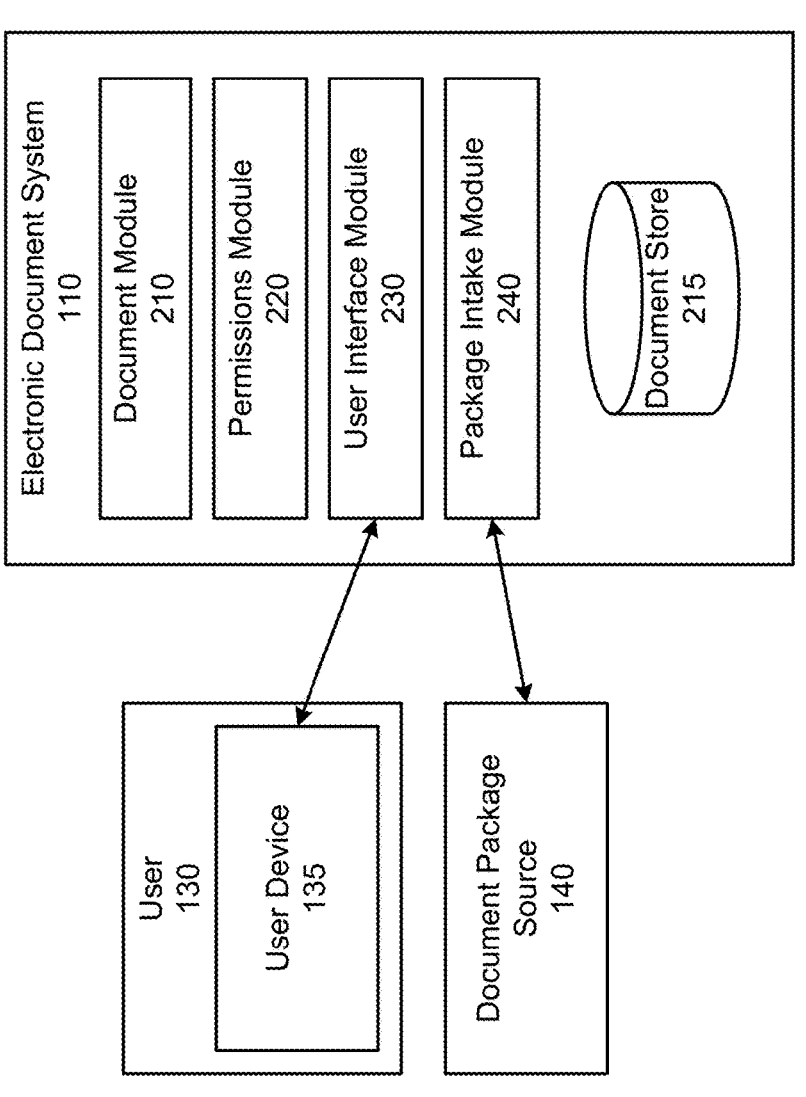
FIG. 2 is a block diagram of an electronic document system, according to an example embodiment.

FIG. 2 is a block diagram of an electronic document system, according to an example embodiment. The environment 200 of FIG. 2 shows an electronic document system 110 including a document module 210, a document store 215, a permissions module 220, a user interface (UI) module 230, and a package intake module 240. In various embodiments, the electronic document system 110 may include fewer or additional components that are not shown in FIG. 2. For example, conventional components such as network interfaces, security functions, load balancers, failover servers, management and network operations consoles, and the like are not shown so as to not obscure the details of the system architecture. The functions of the electronic document system 110 may be distributed among the components in a different manner than described. In FIG. 2, the environment 200 additionally shows a user 130 with a corresponding user device 135 interacting with the UI module 230 and a document package source 140 interacting with the package intake module 240.

The document module 210 can generate new documents, manage and update documents stored by the electronic document system 110, and maintain a version history of edits (or other updates) to documents within the electronic document system 110. In some implementations, the document module 210 stores the documents, document versions, and other metadata related to the documents managed by the electronic document system 110 in document store 215. In some embodiments, the document module 210 can generate document packages from a plurality of documents (as individual component documents) either uploaded or previously stored in the electronic document system 110. In some implementations, the document module 210 stores the document packages in the document store 215. In some embodiments, the document module 210 interacts with the UI module 230, allowing users to create or import new documents, modify or view existing documents (including past versions of a document and metadata about the document), and otherwise interact with documents or document packages of the electronic document system 110. Documents and/or document packages can be associated with one or more actions that are automatically taken by the document module 210 when the document and/or document package is imported, identified, or otherwise retrieved. In some implementations, the document module 210 maintains a version history recording changes made to documents or document packages. For example, a version history of a document can include a record of previous changes to a clause (as well as previous versions of the clause), a time and/or date when each change was made, and an identifier of the user (e.g., the user 130) that made each change. In another example, a version history of a document package can include a record of previous changes to one or more component documents included in the document package, such as an added document topic for each component document.

The document store 215 is a file storage system, database, set of databases, or other data storage system storing documents, document packages (and corresponding component documents), version histories, and other information about documents or document packages managed by the electronic document system 110. The document store 215 can be implemented locally, remotely, using cloud computing services, or using any other suitable hardware or software techniques to store data.

The permission module 220 can manage and enforce user permissions for documents and document packages managed by the electronic document system 110, according to some embodiments. As described above, documents and document packages can be associated with permissions controlling which users 130 can view, import, modify, and/or otherwise interact with that type of document or document package. In some implementations, permissions managed by the permissions module 220 explicitly reference a specific user 130 (for example, by name or unique user identifier). For example, a document package can be explicitly associated with one (or more) users 130 to oversee the electronic document system 110 as it splits the document package into one or more component documents and/or labels each component document with a corresponding document topic.

Permissions may also be assigned to users 130 using a set of defined rules, for example, rules based on membership in an entity, group, or subgroup of users 130 and/or characteristics of the user 130. Users 130 may be assigned additional permissions based on an associated with a specific company or based on membership in a subgroup of users 130 (such as a legal team of a company). Similarly, a type of document or document package can be associated with one or more roles, each with defined permissions (such as "buyer" or "buyer's agent"). Individual users 130 can then be assigned to the roles for each instance of a document/document package of that type.

The permission module 220 may store permissions in a set of "permission definitions" storing permissions for a user 130 (or group of users). In some implementations, each permission definition stores a description of one or more permissions (for example, editing or viewing permissions), an indication of one or more entities 140, documents, or document packages the permission definition applies to, and identification of the set of users 130 the permission definition applies to. For example, a permission definition can grant permissions to a user 130 based on an individual identifier of the user 130, based on association with an entity 140, based on the user's membership in a subgroup or association with a role or title, or based on another characteristic of the user 130. Similarly, a permission definition can define the documents and/or document packages the permission definition applies to based on a direct identifier of an entity 140, document, or documents package or based on a logic rule defining documents and/or clauses the permission definition grants permissions to. For example, a permission definition can specify a combination of one or more document types (such as "sales contract"), and/or user characteristics defining situations to which the permission definition applies.

The permission module 220 may assign permissions to view, edit, approve edits to, sign, or otherwise modify a document. Similarly, the permission module 220 can assign various permissions related to the import and management of document packages, such as permissions for uploading document packages, and permissions for modifying how the electronic document system 110 recognizes component documents for certain types of document packages. Other implementations of the permissions module 220 can include more or different permissions assignable to users 130.

The UI module 230 generates user interfaces allowing users 130 to interact with documents and/or document packages managed by the electronic document system 110, according to some embodiments. For example, the UI module 230 can receive user instructions from a web-based or mobile application the user 130 interacts with via the user device 135 to provide instructions to the electronic document system 110. In some implementations, the UI module 230 provides a UI enabling users 130 to add, delete, or modify the contents of a document based on one or more permission definitions. A UI provided by the UI module 230 can allow users to modify content such as text, images, links to outside sources of information such as databases, and the like. Similarly, the UI module 230 can provide a UI for authorized users 130 to view or modify permissions definitions granting permissions to other users 130. The UI module 230 may also provide UIs for setting up the electronic document system 110 to import a type of document package, importing document packages, managing imported document packages, and the like. In some implementations, the UI module 230 displays to a user 130 a document package by presenting each component document and each component document's corresponding document topic.

The package intake module 240 receives document packages from a document package source 140 (such as a user 130 or an automated system) and performs several analyses on the received document packages. In some embodiments, the package intake module 240 utilizes an ensemble machine learning model to identify component documents within a received document package and to identify a document topic (e.g., a main idea and/or a subject of) each component document for each identified component document. The ensemble machine learning model may include at least two trained machine learning models (e.g., a first machine learning model for identifying the component documents and a second machine learning model for identifying a document topic for each component document). The package intake module 240 may further partition (or split) the document package into the individual component documents prior to the UI module 230 displaying the document package to a user 130 (e.g., by displaying the individual component documents with corresponding topic to the user 130).

In alternative embodiments, the package intake module 240 utilizes a heuristics-based approach to perform an analysis on a received document package. For example, the package intake module 240 may use one or more identification methods (e.g., one or more document identification rules) to identify the component documents within a document package. In another alternative embodiment, the package intake module 240 utilizes the heuristics-based approach to identify the component documents within a document package and a machine learning model to identify a document topic for each component document.

Figure 3:
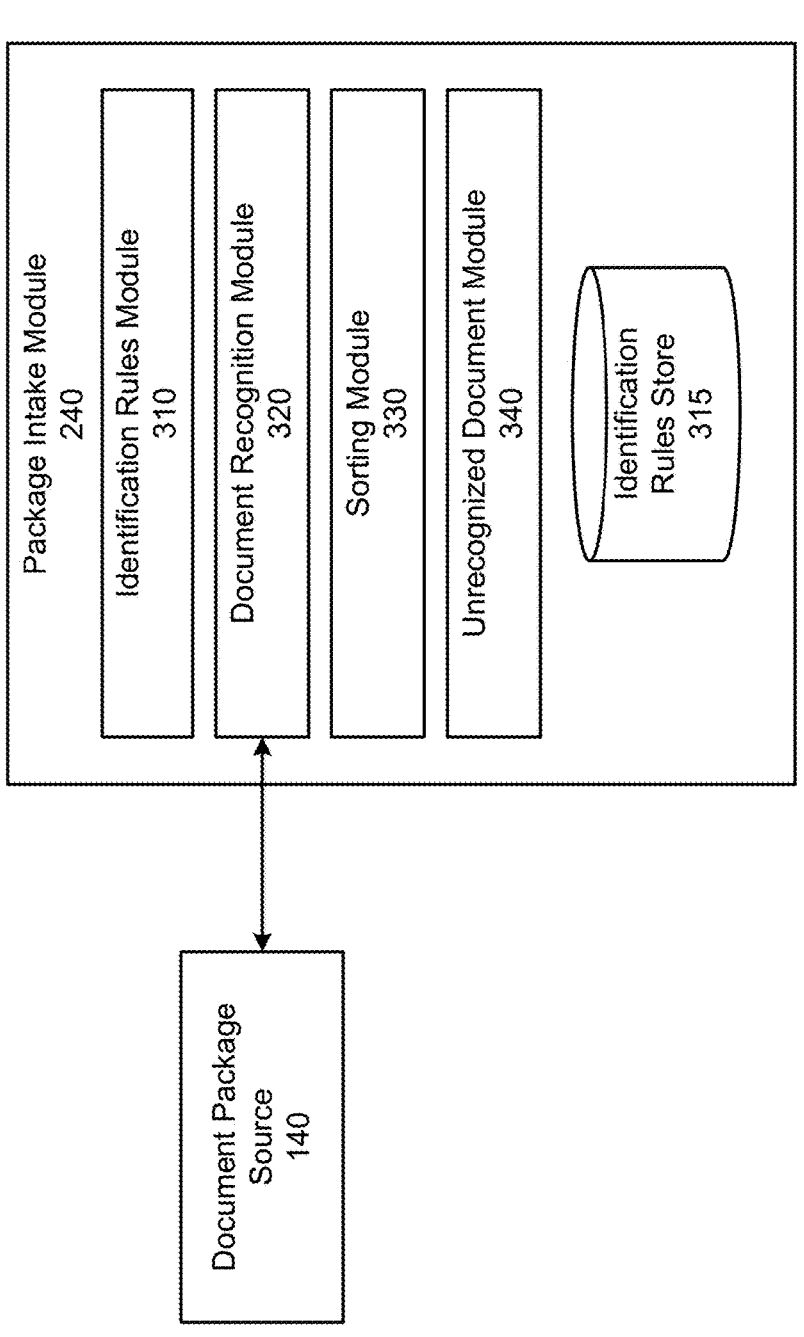
FIG. 3 is a block diagram of the package intake module of FIG. 2.

FIG. 3 is a block diagram of the package intake module of FIG. 2. The package intake module 240 of FIG. 3 includes an identification rules module 310, an identification rules store 315, a document recognition module 320 in communication with a document package source 140, a sorting module 330, and an unrecognized document module 340. In various embodiments, the package intake module 240 may include fewer or additional components that are not shown in FIG. 3. The functions of the package intake module 240 may be distributed among the components in a different manner than described The identification rules module 310, according to some embodiments, allows users 130 to create (or update) package templates, add document identification rules to package templates, configure a document identification rule to identify a specific type of document, separate component documents into stacks, and otherwise modify package templates. A package template, as used herein, is a collection of rules used to identify instances of a type of one or more component documents within a received document package. For example, the document identification rules for recognizing a specific tax form can include rules that can identify instances of that tax form regardless of the specific contents of that instance of the form. Each document identification rule may identify a set of recognition methods and parameters the package template can use to identify documents. Depending on the identification methods relied on in a package template, the package template may apply to a wide range of potential document packages. For example, real estate closing document packages generally contain documents from out of set of potential closing documents (as certain types documents might not be needed for every transaction) but the length, format, and order of documents within a specific instance of a real estate closing document package may vary depending on the specifics and complexity of that real estate transaction (and which document package source 140 initially put together the real estate closing document package). Therefore, the package template for a closing document package can be flexible enough to apply to a variety of closing document packages received from (potentially) multiple different document package sources 140.

In some embodiments, each package template is associated with permission for administrator users ("package administrators") for that package template. A package administrator may initially set up the package template using the identification rules module 310 and can later return to update or otherwise modify the package template. As described above, the package intake module 240 may separately assign permissions for individual document packages recognized using the package template (a package administrator for a package template does not necessarily have administrator permissions over each instance of a document package processed using the package template). Using the identification rules module 310, package administrators can prepare package templates informing the package intake module 240 how to reliably identify component documents for a type of document package.

Figure 4:
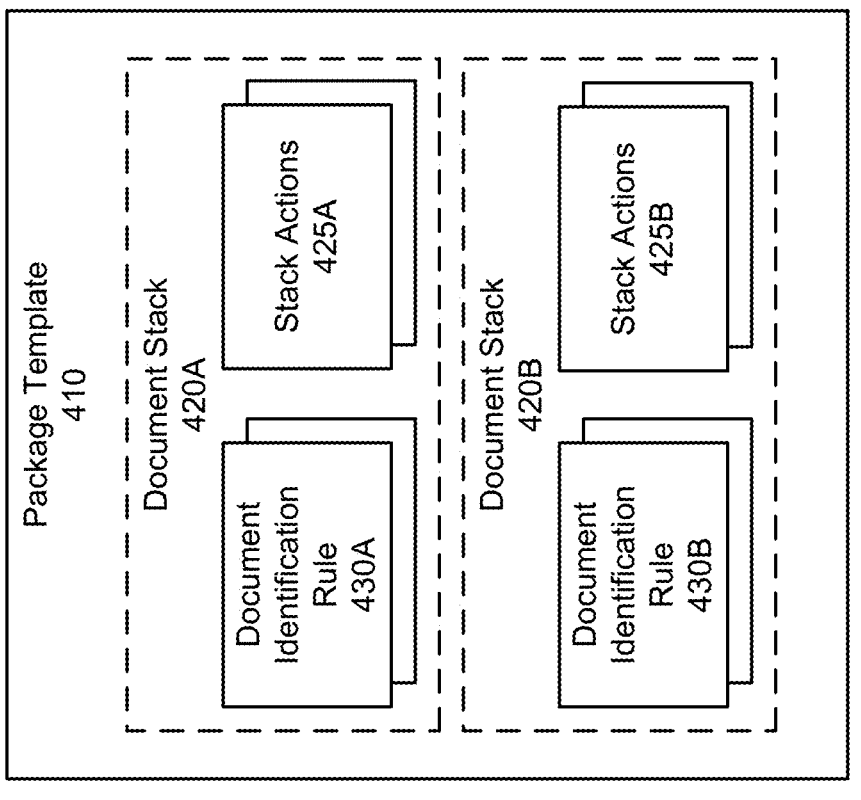
FIG. 4 is a block diagram of a package template, according to an example embodiment.

FIG. 4 is a block diagram of a package template, according to an example embodiment. The package template 410 of FIG. 4 includes several document stacks 420 (e.g., a document stack 420A and a document stack 420B), each associated with a set of document identification rules 430 (e.g., a set of document identification rules 430A and a set of document identification rules 430B, respectively) and a set of stack actions 425 (e.g., a set of stack actions 425A and a set of stack actions 425B, respectively). Additionally, each package template can be associated with metadata, such as identifiers of package administrators, and a name and description of the package template (for example, to aid an importing user 130 in selecting the correct package template).

Each document stack 420 (also referred to as a stack 420) represents a group of component documents (identified using document identification rules 430) on which stack actions of the set of stack actions 425 associated with the document stack 420 are performed by the electronic document system 110 when the document package is being imported. Each component document may be associated with more than one document stack 420, for example, for document stacks 420 reporting distinct but overlapping sets of component documents to different entities. Similarly, some implementations can use a hierarchical model for document stacks 420, where a sub-stack can include additional stack actions of the set of stack actions 425 to be performed only on the sub-stack. Package template 410 may include a default document stack (and default stack actions).

A set of stack actions 425 may include instructions for reporting or sending a copy of the document stack 420 to a certain user 130, user role, or other entity, for example, via email, physical mail, or notification within the electronic document system 110. Similarly, stack actions can instruct the electronic document system 110 to automatically take a specific action on the document stack 420, such as changing the storage location or status of a component document within the electronic document system 110, adding the document stack 420 to a collaborative "room" or space within the electronic document system 110 where it is viewable and/or editable by users 130 (such as a room devoted to a real estate closing event), associating documents of the document stack 420 with a specific task in a workflow of the electronic document system 110, marking the document stack 420 for deletion, locking the document stack 420 from future editing, or the like. Additionally, a set of stack actions 425 may instruct the electronic document system 110 to require users 130 (identified either by a user identifier or indirectly through association with a specific role) to take actions related to the document stack 420 and/or assign relevant permissions to those users 130 (such as editing/viewing/approval permissions). For example, a stack action in the set of stack actions 425A may request that a user 130 digitally sign (or wet sign) the documents of a document stack 420A. In some implementations, a document stack 420 is associated with more than one stack action. For example, a set of stack actions 425 that requests a digital signature can include a first action assigning signing permissions to a specific user role, a second action for tagging a component document with the correct locations for the user to sign (based on a template for the component document), and a final action for sending a notification to the user to digitally sign the document stack 420.

In some implementations, the package intake module 240 may select stack actions to be taken for a document stack 420 out of multiple options defined in the package template 410 based on, for example user 130 selection or metadata of the document package. For example, a user 130 could specify that an uploaded document package should be handled using "fully digital" or "hybrid digital/wet sign" stack actions defined in a package template 410. If the hybrid option is selected, the package intake module 240 can select physical signature workflow stack actions for one or more document stacks. Alternatively, if the user 130 selects the fully digital option, those same document stacks may instead be associated with a digital signature workflow.

The set of document identification rules 430 can include identification methods and parameters allowing the package intake module 240 to identify the pages of a component document out of the document package. In some implementations, a document identification rule uses different identification methods to identify different parts of the component document. For example, the first page of a component document may be easy to identify, but subsequent pages may be identified by inference (for example, due to proximity to the identified first page). Document identification methods can include recognizing a document-specific identifier for the desired type of document on one or more pages. For example, document-specific identifier can be a text identifier (such as a form number, title of the document, or the like), a barcode (or a QR code), or another unique feature of that type of document (compared to other documents in the document package). Similarly, a document identification rule can use relative identifiers (such as page numbers, or position within the document package) to identify a component document or link additional pages to a certain component document. For example, a page number on a page including a text identifier can be used to also associate other pages following that numbering scheme with the text identifier. Similarly, positional identifiers can also be used to identify some component documents, such as for document packages where the component documents are always presented in a certain order (or if a certain component document always occurs first) and/or where a component document is always a fixed length.

In some implementations, each document identification rule includes one or more identification methods (such as document identifier on every page, fixed length document, or document identifier combined with page number) and appropriate parameters for those identification methods. Parameters for an identification method can include, for example, an identifier type and master identifier (such as a standardized title or barcode number that the package intake module 240 will match with the document content), the number of pages in a fixed length document, and/or a position of a component document relative to other component documents. One document identification rule of the set of document identification rules 430 may include multiple identification methods with logical relationships to each other. For example, two identification methods can be arranged as alternates (a logical OR relationship) such as for a document that may have two alternate titles recognized by text identifiers. Similarly, identification methods within a document identification rule can have logical AND relationships or any combination of relationships. In some embodiments, a document identification rule is associated with one or more conditions for being satisfied for a given document, such as all (or a threshold number or percent) of the associated identification methods matching the given document. A document identification rule of the set of document identification rules 430 may additionally include further details about the component document. For example, a document identification rule of the set of document identification rules 430A can additionally specify a priority order or hierarchy for ordering component documents within the document stack 420A (allowing the order of component documents within stack 420A to be specified independent of ordering within a received document package), a pre-made digital signature template marking various points for signature, and/or a task identifier for one or more tasks associated with that type of component document.

Returning to the identification rules module 310 of FIG. 3, a package administrator may interact with the identification rules module 310 to add or modify a package template 410, document stacks 420, set of stack actions 425, or set of document identification rules 430. In some implementations, when adding a document identification rule, the package administrator can upload an example document package for the package template that is being created. Once an example document package is received, the identification rules module 310 can apply any existing document identification rules to the uploaded document package and notify the package administrator of any already-recognized component documents (for example, component documents the package administrator has already finalized the document identification rules for).

Using the example document package, the identification rules module 310 may suggest one or more identification methods for the set of document identification rules 430 that can be approved or refined by the package administrator. For example, the identification rules module 310 may automatically recognize keys for identification methods supported by the package intake module 240, such as barcodes in a document package, a text identifier appearing a subset of pages, page numbers, or the like, and suggest these potential identification methods to the package administrator to generate a document identification rule. The package administrator can then manually select, add to, and/or modify the suggested set of identification methods to generate a final document identification rule to the set of document identification rules 430, assign the component document to a document stack 420 and provide any other needed metadata for the component document (such as a digital signature template if that component document will need to be signed by a user 130). This process can then be repeated for other suggested identification methods, document identification rules, and example document packages until the package administrator is satisfied that the package template 410 is complete.

The identification rules store 315 can store generated package templates 410, according to some embodiments. The identification rules store 315 can be a database, database cluster, file-based storage system, cloud database, or other storage method.

The document recognition module 320, according to some embodiments, receives document packages from a document package source 140 and performs one or more analyses on the received document package. In some implementations, the document recognition module 320 uses an ensemble machine learning model to recognize the component documents within the received document package. In alternative implementations, the document recognition module 320 uses a heuristics-based (or rules-based approach), for example by using a set of document identification rules 430, to recognize one or more component documents contained in the received document package. In some implementations, the document recognition module 320 uses the ensemble machine learning model to determine a document topic for each identified component document within the received document package.

Figure 5:
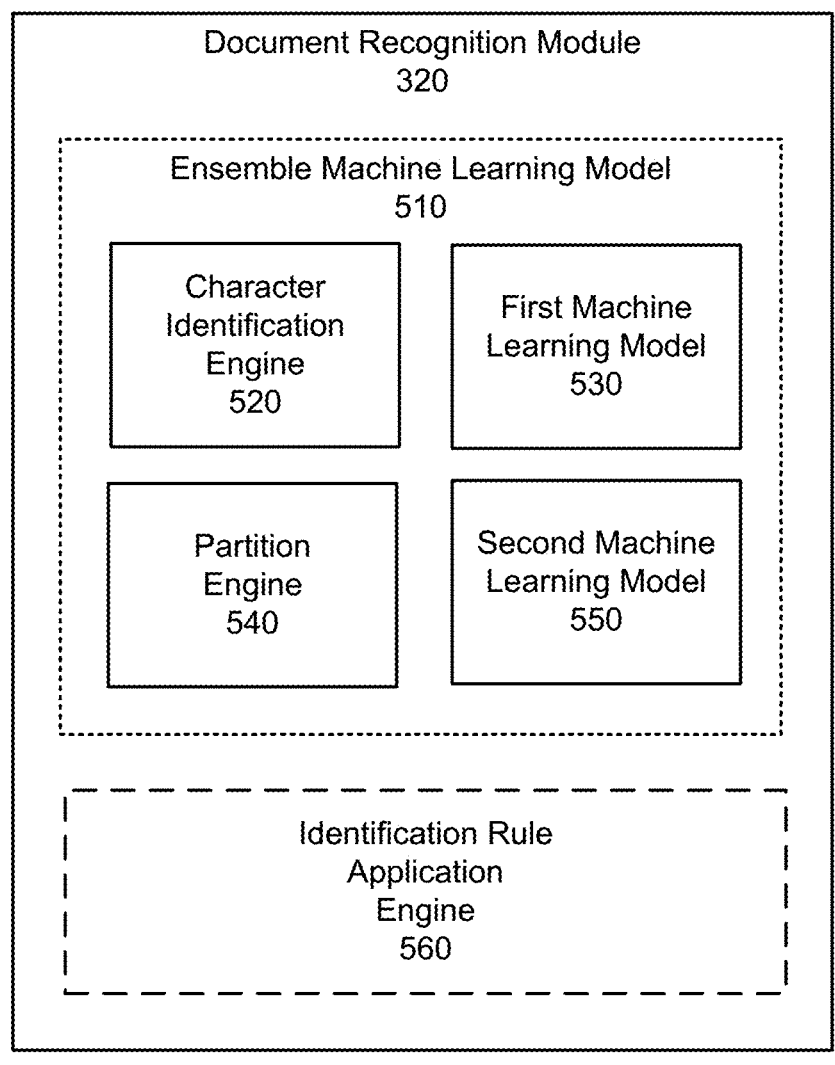
FIG. 5 is a block diagram of the document recognition module of FIG. 3.

FIG. 5 is a block diagram of the document recognition module of FIG. 3. The document recognition module 320 of FIG. 5 includes an ensemble machine learning model 510 and an identification rule application engine 560. As described above, in some embodiments, the ensemble machine learning model 510 identifies the component documents within the received document package. And, in other embodiments, the identification rule application engine 560 identifies the component documents. In various embodiments, the document recognition module 320 may include fewer or additional components that are not shown in FIG.

5. The functions of the document recognition module 320 may be distributed among the components in a different manner than described.

The ensemble machine learning model 510 includes a character identification engine 520, a first machine learning model 530, a partition engine 540, and a second machine learning model 550. In alternative embodiments (not shown), the ensemble machine learning model 510 may include additional machine learning models as described in more detail below.

The character identification engine 520 extracts characters and/or words included in the document package. Characters may include individual text (e.g., a letter, a number, a symbol, etc.), a document tag or field (e.g., a signature, a set of initials, etc.), and/or an image (e.g., a logo, a picture, a drawing, etc.) included in the document package. In some embodiments, the character identification engine 520 uses known character identification techniques (e.g., optical character recognition (OCR)) to extract the characters and/or words and a corresponding location of each character or word (e.g., a location coordinate on a page, a location coordinate within the document package, or both). In some embodiments, the character identification engine 520 identifies characters (i.e., text) or words with specific text characteristics. Specific text characteristics may include a font, a size, a position (e.g., a heading, a sub-title, indented text, etc.), and/or a typographical emphasis (e.g., bold, italicized, underlined, etc.).

The first machine learning model 530 identifies a page of each component document of the document package having a predefined property. For example, the first machine learning model 530 is input a received document package and determines which pages included in the plurality of pages of the document package are a page having the predefined property. In some embodiments, the first machine learning model 530 is input the extracted characters and/or words identified by the character identification engine 520 of each page and outputs a probability, for each page of the document package, that the page has the predefined property. In some embodiments, a subset of extracted characters and/or words located at one or more predetermined locations on each page of the document package are input into the first machine learning model 530. For example, only the first 150 characters located at the beginning of each page, only the last 150 characters located at the end of each page, or a combination thereof, are input into the first machine learning model 530. In another example, only the first 50 words at the beginning of each page, only the last 50 words located at the end of each page, or a combination thereof, are input into the first machine learning model 530. In some embodiments, the first machine learning model 530 is input any specific text characteristics associated with characters and/or words.

Based on any combination of the above-mentioned inputs, the first machine learning model 530 determines a probability or likelihood that each page has the predefined property. The predefined property identifies a type of page. For example, the predefined property may be a first page, a last page, or an interim page (e.g., any page that is not a first page or a last page). A higher probability (e.g., above 75%, above 80%, etc.) indicates the page is more likely to have the predefined property. In some embodiments, the probabilities output by the first machine learning model 530 are compared to a threshold probability (e.g., 85%) and any page with a corresponding probability above the threshold probability is identified as a page having the predefined property.

Depending on the predefined property, the first machine learning model 530 may identify only first pages, only last pages, or only interim pages included in the plurality of pages of a document package. For example, the first machine learning model 530 determines pages that have a first predefined property (e.g., the first machine learning model 530 identifies all first pages included in the document package). In some embodiments, more than one type of page may be identified by the first machine learning model 530 (e.g., more than one predefined property may be utilized by the first machine learning model 530). For example, the first machine learning model 530 determines pages that have a first predefined property or a second predefined property (e.g., the first machine learning model 530 identifies all first pages and all last pages included in the document package). In another example, the first machine learning model 530 determines pages that have a first predefined property, a second predefined property, or a third predefined property (e.g., the first machine learning model 530 identifies all first pages, all last pages, and all interim pages included in the document package).

In some implementations, the first machine learning model 530 identifies a page of each component document that has a first predefined property (e.g., is a first page) and a separate machine learning model (not shown in FIG. 5) of the ensemble machine learning model 510 identifies a different page of each component document that has a second predefined property (e.g., is a last page). The first machine learning model 530 may work in parallel with the separate machine learning model to identify the first pages and the last pages of each component document in the document package. In some implementations, a second separate machine learning model (not shown in FIG. 5) of the ensemble machine learning model 510 identifies one or more second different pages in the document package that have a third predefined property (e.g., are an interim page). The first machine learning model 530, the separate machine learning model, and the second separate machine learning model may work in parallel to identify the first pages, the last pages, and the interim pages of each component document.

In some embodiments, the first machine learning model 530, the separate machine learning model, and the second separate machine learning model may work separately to identify the first pages, the last pages, and the interim pages of each component document. For example, the document package is input into the first machine learning model 530 and the output (e.g., a probability for each page of the document package corresponding to whether the page has a first predefined property) of the first machine learning model 530 is compared to a first threshold probability and a second threshold probability that is less than the first threshold probability. If the probability output by the first machine learning model 530 for a page is greater than the first threshold probability the page has the first predefined property and if the probability output by the first machine learning model 530 for a page is less than the first threshold probability and greater than the second probability, the page is input into the separate machine learning model and the second separate machine learning model for further analysis. The output (e.g., a probability the page of the document package has a second predefined property) of the separate machine learning model and the output (e.g., a probability the page of the document package has a third predefined property) of the second separate machine learning model are compared to a third threshold probability. If the outputs are less than the third threshold probability, the page is determined to have the first predefined property. If one or both outputs are greater than the third threshold probability, the page does not have the first predefined property and the output of the separate machine learning model and the output of the second separate machine learning model are compared to threshold probabilities associated with identifying whether the page has either the second predefined property or the third predefined property.

The first machine learning model 530 is trained to identify a page of each component document having a predefined property based on a first set of training data. The first set of training data includes a plurality of pages of component documents and at least a page of the plurality of pages is labeled to indicate that the page has the predefined property. For example, in a scenario where the first machine learning model 530 is trained to identify a first page of each component document of the document package, the first set of training data includes at least one page of a plurality of pages labeled as having the predefined property (e.g., indicating that the page is a first page). In this same example, the first set of training data may include a label on the other pages (i.e., not the first page) indicating that those pages do not have the predefined property (e.g., indicating that those pages are not a first page). In some embodiments, prior to providing the first set of training data to the first machine learning model 530, the first set of training data is augmented to identify characters, words, and/or specific text characteristics included on at least the labeled page of the plurality of pages. The first machine learning model 530 may associate particular characters, words, and/or specific text characteristics with the labeled page.

In some embodiments, particular characters, words, specific text characteristics or any combination thereof are more likely to be present on a labeled page (e.g., a first page). For example, first pages are more likely to include a particular number (e.g., a "1") on a bottom location of the page or a particular word and a number combination (e.g., "Page 1") with the word and number located adjacent to one another on the page. In another example, first pages are more likely to include a specific text characteristic (e.g., a title). The first machine learning model 530 may determine certain patterns of particular characters, words, specific text characteristics or any combination thereof that are present on labeled first pages in the training set and/or on previously identified first pages. These patterns may be given a weight such that if these patterns are present on a page of a received document package that is fed into the first machine learning model 530, the probability output by the first machine learning model 530 that the page is a first page is higher.

In another example, particular characters, words, specific text characteristics or any combination thereof are more likely to be present on a labeled last page. For example, last pages are more likely to include a particular word-number-word-number combination (e.g., "Page 15 of 15") where each number in the combination is the same on the page. In another example, last pages are more likely to include a particular document tag or field (e.g., a signature). The first machine learning model 530 may determine certain patterns of particular characters, words, specific text characteristics or any combination thereof that are present on labeled last pages and increases a weight for these patterns such that if these patterns are present on a page of a received document package that is fed into the first machine learning model 530, the probability output by the first machine learning model 530 that the page is a last page is higher.

Different machine learning techniques may be used in various embodiments of the first machine learning model 530. For example, neural networks (e.g., a gated recurrent unit (GRU) neural network, a long short-term memory (LSTM) neural network, an Elman neural network, etc.) or other deep learning algorithms may be utilized.

The partition engine 540 splits the document package into each component document based on the output(s) from the first machine learning model 530 (an any other machine learning model that is identifying various pages of the document package as described above). For example, if the first machine learning model 530 identified a first page of each component document, the partition engine 540 identifies each subsequent page in the plurality of pages following a first page and prior to a next identified first page or prior to an end of the document package. The partition engine 540 groups the first page and its corresponding subsequent pages (e.g., including all interim pages and a last page) together as a first component document. The partition engine 540 performs this process for each identified first page until the document package is split into each component document. In another example, if the first machine learning model 530 identified a last page of each component document, the partition engine 540 identifies each page in the plurality of pages prior to a last page and subsequent to a next identified last page or subsequent to a beginning of the document package. The partition engine 540 groups the last page and its corresponding prior pages (e.g., including all interim pages and a first page) together as a first component document. The partition engine 540 performs this process for each identified last page until the document package is split into each component document.

In some embodiments, the partition engine 540 receives outputs from more than just the first machine learning model 530. For example, the first machine learning model 530 identified all first pages and another machine learning model identified all last pages. The partition engine 540 identifies all subsequent pages (e.g., all interim pages) taking place in between a first identified first page and a first identified last page. The partition engine 540 groups together the first identified first page, the corresponding subsequent pages, and the first identified last page together as a first component document. The partition engine 540 performs this process for each identified first page and last page until the document package is split into each component document.

The second machine learning model 550 identifies a document topic for each component document. In some embodiments, the second machine learning model 550 is input the extracted words identified by the character identification engine 520 included in a component document (e.g., based on the location of each word) and outputs one or more probabilities that the component document corresponds to one or more document topics. The second machine learning model 550 can identify a document topic for each identified component document in the document package in parallel. The one or more probabilities indicates a likelihood that the corresponding one or more document topics is a document topic for the component document. A higher probability indicates the component document is most likely associated with a particular document topic. In some embodiments, the one or more probabilities are compared with a threshold probability to determine which document topic is appropriate for the component document. For example, the document topic with a corresponding probability greater than the threshold probability is the identified document topic for that component document.

The second machine learning model 550 is trained to identify a document topic for each component document based on a second set of training data. The second set of training data includes a plurality of component documents with each component document labeled with a set of word counts and a document topic. In some embodiments, a portion of the label (e.g., the document topic) is manually applied to each component document. The set of word counts includes a tally for each word used in a corresponding component document. In some embodiments, the second set of training data is augmented. For example, a set of word counts may be augmented to exclude word counts for extraneous words (e.g., "a", "an", or "the") and/or to combine word counts of words. For example, a set of word counts may be augmented to combine word counts for a word and its corresponding part participle and/or their corresponding present participle. For example, a word count for the word "help" and a word count for the word "helped" (part participle) is combined into one word count associated with the word "help" in the set. In another example, a word count for the word "write" and a word count for the word "writing" (present participle) is combined into one word count associated with the word "write" in the set. In another example, a set of word counts may be augmented to combine word counts for a word and its corresponding plural tense. For example, a word count for the word "agree" and a word count for the word "agrees" (plural tense) is combined into one word count associated with the word "agree" in the set.

Words used most frequently within a component document based on the set of word counts are associated with the document topic in the second training set of training data. For example, the top five, ten, fifteen, etc. most frequently used words are associated with the document topic. In another example, words with a word count above a predetermined threshold word count (e.g., above 20, 30, etc.) are associated with the document topic. During training, the second machine learning model 550 learns to associate frequently used words and/or combinations of frequently used words with one or more corresponding document topics.

During operation, the second machine learning model 550 is input the extracted words identified by the character identification engine 520 included in each component document of a received document package and compares frequently used words of each component document to frequently used words and/or combinations of frequently used words and the corresponding document topic(s) from the training data. Based on the comparison, the second machine learning model 550 outputs at least one probability that a component document corresponds to a document topic.

Different machine learning techniques may be used in various embodiments of the second machine learning model 550. For example, a transformer-based machine learning technique, such as bidirectional encoder representations from transformers (BERT), or other deep learning algorithms, such as LSTMs, biLSTMs, GRUs, etc. may be utilized. Additionally, other natural language processing models, such as latent dirichlet allocation (LDA) and/or GloVe, may be utilized in the second machine learning model 550.

The identification rule application engine 560 first determines an appropriate package template 410 to apply to the document package (for example automatically, based on a selection by an importing user, based on metadata of the document package, or the like). Then, the identification rule application engine 560 applies each document identification rule associated with the package template 410 to the document package to identify one or more component documents within the document package. In some implementations, each component document is identified as a range of pages within the received document package.

In some embodiments, the component documents identified by the identification rule application engine 560 are provided to the ensemble machine learning model 510. The component documents may be provided to the character identification engine 520 and to the second machine learning model 550. The second machine learning model 550 determines a document topic for each identified component document.

Returning to the package intake module 240 of FIG. 3, the sorting module 330, in some implementations, can assign each recognized component document to the appropriate document stack(s) 420 based on the identification rule application engine 560 and split the component document out of the document package. The sorting module 330 can then determine if there are any unrecognized pages not associated with a component document and/or document stack in the document package. The unrecognized pages of a document package can be assigned to a temporary unrecognized page stack for resolution by the unrecognized document module 340. The sorting module 330 may wait for the unrecognized document module 340 to resolve all unrecognized pages (by assigning them to documents and/or stacks) before the package intake module 240 continues processing the document package. In some implementations, a package template 410 may include a default stack action for the unrecognized document stack, such as a stack action grouping any unrecognized pages into an "unrecognized document" and notifying one or more users 130 of the unrecognized document for manual correction.

In some embodiments, the package intake module 240 relies on user 130 input (for example, via the unrecognized document module 340) to resolve unrecognized pages within document packages before proceeding with performing stack actions or otherwise making component documents of the document package available to the rest of the electronic document system 110. Similarly, some types of document package require a manual approval or review of the automatic sort performed by the document recognition and sorting modules 320 and 330 before the package intake module 240 can perform stack actions. For example, a package template 410, importing user 130, or document package source 140 can be flagged as requiring manual approval (for an importing user 130 or other user with appropriate permissions) in cases where a document package contains high risk, sensitive, or regulated component documents.

Once the recognition process for a document package is complete (for example, if the document package has no unrecognized pages and/or has received appropriate manual approvals), the package intake module 240 may perform each set of stack actions 425 on the component documents associated with the stack 420 (including any previously unrecognized pages or documents manually reassigned to different stacks). As described above, in some embodiments, the package intake module 240 can perform stack actions on assigned to the unrecognized document stack. Performing a stack action may involve other components of the electronic document system 110 to contact users 130, create or modify documents within the electronic document system 110, prepare a document for digital signature, or the like.

The unrecognized document module 340 may display to an importing user 130 (or other authorized user 130) an interface identifying unrecognized pages in the document package. Through the unrecognized document module 340, a user 130 can, in some embodiments, manually review unrecognized pages, associate unrecognized pages with existing documents, and/or generate new documents including unrecognized pages. Similarly, the user 130 can associate documents generated from unrecognized pages with stacks 420 or create new stacks 140 and associated stack actions for newly generated documents. In some implementations, the unrecognized document module 340 also provides an importing user 130 (or other appropriate user(s) 130) an interface for reviewing the automatically recognized documents/document pages and overriding the default stack actions or stack assignments for that document package. For example, a package template 410 can be generated by a package administrator to apply to a type of document package to be regularly processed by the electronic document system 110. However, some instances of that type of document package may include additional or non-standard documents or stack actions (for example, based on a special request by a client) not covered in the package template 410. To handle these situations or to correct any errors in the package template 410, the unrecognized document module 340 allows users 130 to make changes to the handling of a specific document package without altering the package template 410 itself.

In some implementations, the set of unrecognized pages, the corresponding manual changes/assignments made using the unrecognized document module 340, the uploaded document package, and/or the applied package template 410 are logged for later use in improving the package template 410 (for example, to recognize previously unrecognizable pages or to account for an overlooked document or page appearing in many document packages). For example, improvements to a package template 410 may be made manually, through an update of the package template 410 by a package administrator. The package administrator can review all instances of unrecognized pages (and corresponding manual fixes) for a package template 410 and adjust the package template 410 accordingly. For example, a certain type of document may be associated with a document identification rule that does not cover all forms of that document type (such as a document type including optional appendixes or alternate formatting that weren't considered when the associated document identification rule was created). The package administrator for the package template 410 can then add new document identification rules to the set of document identification rules 430 to properly identify alternate forms of the document type and reduce the number of unrecognized pages when future document packages are uploaded.

However, improvements to the accuracy of the package template 410 may be made without direct user input. In some implementations, the unrecognized document module 340 can use probabilistic methods (such as trained machine learning models) to supplement the generally deterministic document identification rules. For example, the unrecognized document module 340 may train a machine learning model to automatically assign (or make suggestions to assign) unrecognized pages based on logged sets of unrecognized pages and corresponding manual changes/assignments made for previous uploaded document packages associated with the same package template 410. Probabilistic recognition methods can be used to supplement the initial results achieved using the document identification rules. Similarly, in some embodiments, the package intake module 240 uses machine learning techniques to automatically make or suggest to a package administrator updates to a package template 410 based on unrecognized document and/or manual update logs. For example, a package administrator can access the identification rules module 310 to update an existing package template 410 using a similar interface used to generate new package templates. The identification rules module 310 can then present examples of logged document packages (or just the unrecognized pages) for that package template along with suggested identification methods for the logged unrecognized pages (similar to the use of example document packages in the creation of package templates, as discussed above).

FIG. 6A illustrates a first embodiment of an example page included in a document package. The first embodiment of the example page 600 is first analyzed by the character identification engine 520 when the electronic document system 110 utilizes the ensemble machine learning model 510 for identifying the various component documents within a document package. The example page 605 is fed into the character identification engine 520 and the characters, words, and/or specific text characteristics are identified. Recall, that locations of the characters, words, and/or specific text characteristics are also identified by the character identification engine 520.

In FIG. 6A, some of the identified characters 610 (e.g., a character 610A and a character 610B) and some of the identified specific text characteristics 620 (e.g., a text characteristic 620A and a text characteristic 620B) are called out. The character 610A is an image (specifically, a company logo for Fresh Software) and the character 610B is a number (specifically, a number located at the bottom of the page 600). The specific text characteristic 620A is capital letters and the specific text characteristic 620B is text located in a title position on the page 600.

The identified characters 610 and identified specific text characteristics 620 are provided to the first machine learning model 530 to identify a page of each component document having a predefined property. For this illustrated embodiment, the first machine learning model 530 is trained to identify any first pages included in the document package. As such, the first machine learning model 530 identifies the example page 600 as a first page due to the presence of the character 610A is an image (specifically, a company logo for Fresh Software) and the character 610B is a number (specifically, a number located at the bottom of the page 600). The specific text characteristic 620A is capital letters and the specific text characteristic 620B is text located in a title position on the page 600.

The first machine learning model 530 of the electronic document system 115 receives identified characters (including the identified characters 610) and identified text characteristics (including the text characteristics 620) for each page (including the sample page 600). In this instance, the first machine learning model 530 is trained to identify pages having a predefined property (e.g., of being a first page) included in the plurality of pages of the document package. The first machine learning model 530 determines the page 600 to be a first page due to the combination of characters 610 and specific text characteristics 620 present on the page 600.

FIG. 6B illustrates a second embodiment of the example page included in the document package. The second embodiment of the example page 605 of FIG. 6B includes document content 615 as well as several potential identification methods within the document content, such as text identifiers 625, a barcode 640, and a page number 650. When the electronic document system 110 utilizes the heuristics-based approach for identifying the various component documents within a document package, the example page 605 is analyzed by the electronic document system 110 as described in more detail below.

The document content 615 of the page 610 can include text content, image content, or the like. In some implementations, text content can be presented in image form (such as for page 605 originating from a scanned document) with or without corresponding editable text elements. The electronic document system 110 may use optical character recognition techniques to generate editable text from an image of text for one or more pages of the document package (including the page 605).

Text identifiers 625, as described above, are text strings or patterns that can be used by the electronic document system 110 to identify a component document. A definition of text identifier 625 can include the text string or pattern and optionally one or more additional parameters, such as a restriction on the portion of the page 605 the text identifier 625 can appear in. For example, some text identifiers 625 may be restricted to the title, header, and/or footer of a page 605, such as in situations where the text identifier 625 may occur in the body text of other documents but only the documents of the desired type are titled with the text identifier 625. The page number 650 of the page 605 can be recognized in a similar way to a text identifier 625.

Barcodes 640 are another type of identifier that can be identified, in some implementations, from the image content of the page 605. While FIG. 6B shows a linear (one-dimensional) barcode 640, the electronic document system 110 may also be capable of recognizing matrix or two-dimensional barcodes, such as QR (Quick Response) codes. Similarly, the electronic document system 110 may additionally use logos, symbols, or other small images as document identifiers. Similar to text identifiers 625, the definition of a barcode identifier 640, an example barcode 640 and optionally one or more additional parameters, such as a restriction on the portion of the page 605 the barcode 640 can appear in, can be included in the set of document identification rules 430.

The electronic document system 110 uses the text identifiers 625, barcode 640, and page number 650 and the document identification rules 430 to identify component documents of the document package.

Figure 7:
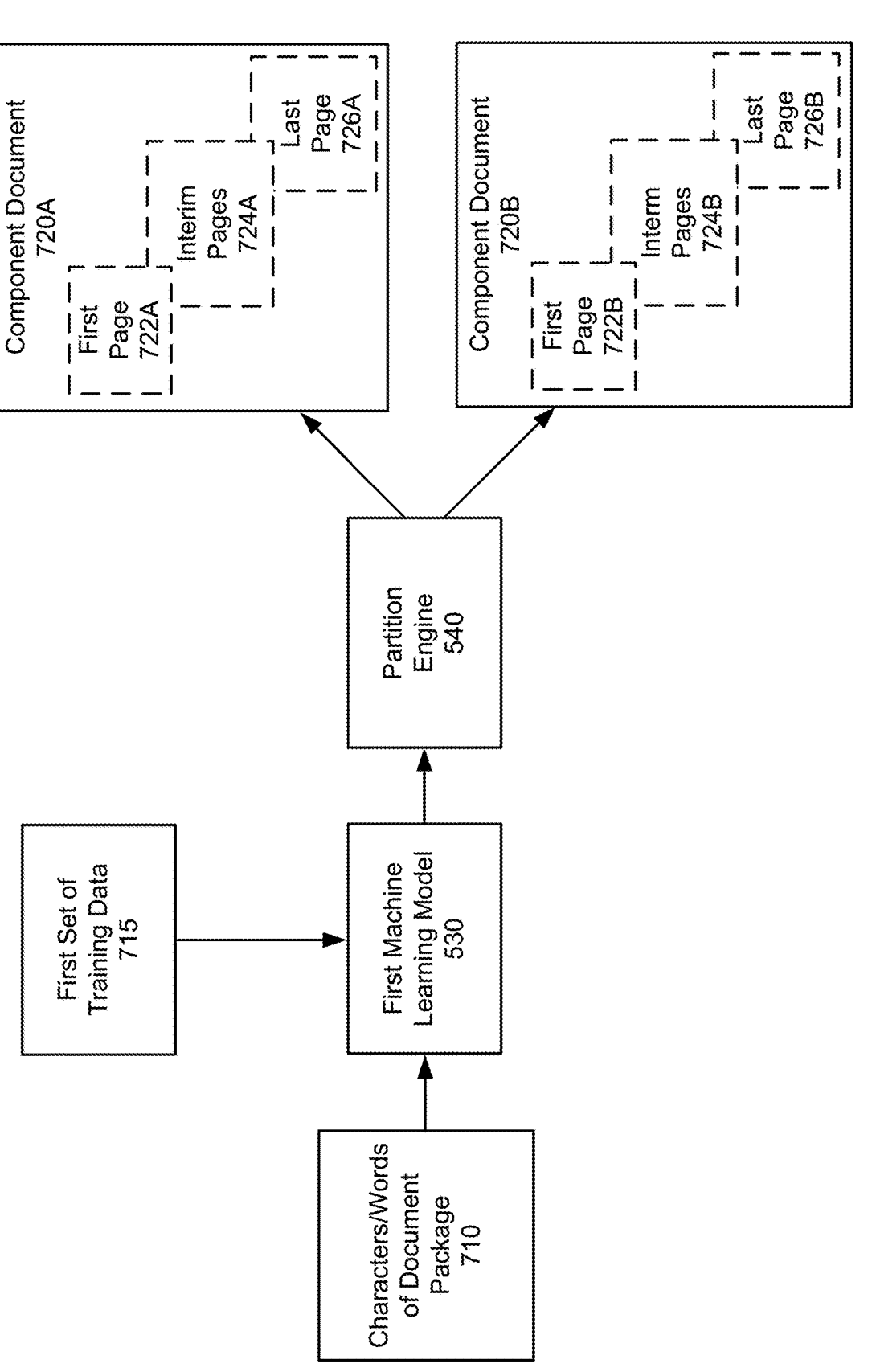
FIG. 7 is a process flow diagram for a first portion of an ensemble machine learning model, according to an example embodiment.

Example Processes for Splitting and Labeling Documents Using the Ensemble Machine Learning Model FIG. 7 is a process flow diagram for a first portion of an ensemble machine learning model, according to an example embodiment. The first portion of the ensemble machine learning model is responsible for splitting a document package into its corresponding component documents. For example, the electronic document system 110 receives a document package from the document package source 140 and extracts characters and/or words 710 from the document package. The extraction is performed by the character identification engine 520 as described in more detail above. The extracted characters and/or words 710 are fed into the first machine learning model 530. The first machine learning model 530 identifies a page of each component document as having a predefined property. In some embodiments, the first machine learning model 530 identifies more than one page of each component document (e.g., a first page of each component document having a first predefined property and a second page of each component document having a second predefined property). In some embodiments, the first machine learning model 530 may work in parallel with one or more additional machine learning models (not shown) that identify other page(s) of each component document having distinct predefined properties.

The first machine learning model 530 is trained by inputting a first set of training data 715. The first set of training data 715 may include a plurality of pages and at least a page of the plurality of pages is labeled to indicate whether the page has the predefined property. For example, the first machine learning model 530 is trained to identify a first page for each component document and the plurality of pages of the first set of training data 715 include at least one first page labeled to indicate it has the predefined property (of being a first page). During operation, the first machine learning model 530 outputs a probability for each page in the received document package that the page has the predefined property (e.g., that the page is a first page). Pages with higher probabilities are more likely to have the predefine property. For example, page(s) of the received document package with a probability greater than 80% are most likely first pages.

The identified pages and the document package are fed into the partition engine 540. The partition engine 540 splits or separates the document package into each individual component document based on the identified page(s). In the same example, the partition engine 540 groups any subsequent pages of an identified first page that take place in the document package either prior to a next identified first page or to the end of the document package as a component document. The partition engine 540 performs these groupings for each identified first page. In the specific embodiment illustrated in FIG. 7, the received document package included two component documents 720 (e.g., a component document 720A and a component document 720B). Each component document 720 includes a subset of the plurality of pages in the document package. In practice, the subset includes a first page 722 and may include one or more interim pages 724 and a last page 726. In the illustrated embodiment of FIG. 7, each component document 720 includes a first page 722, interim pages 724, and a last page 726. In the same example, the partition engine 540 received the document package and two identified first pages (e.g., a first page 722A and a first page 722B) from the first machine learning model 530. The partition engine 540 next identified subsequent pages for the first page 722A and subsequent pages for the first page 722B. The subsequent pages for the first page 722A include interim pages 724A and the last page 726A and the subsequent pages for the first page 722B include interim pages 724B and the last page 726B.

Figure 8:
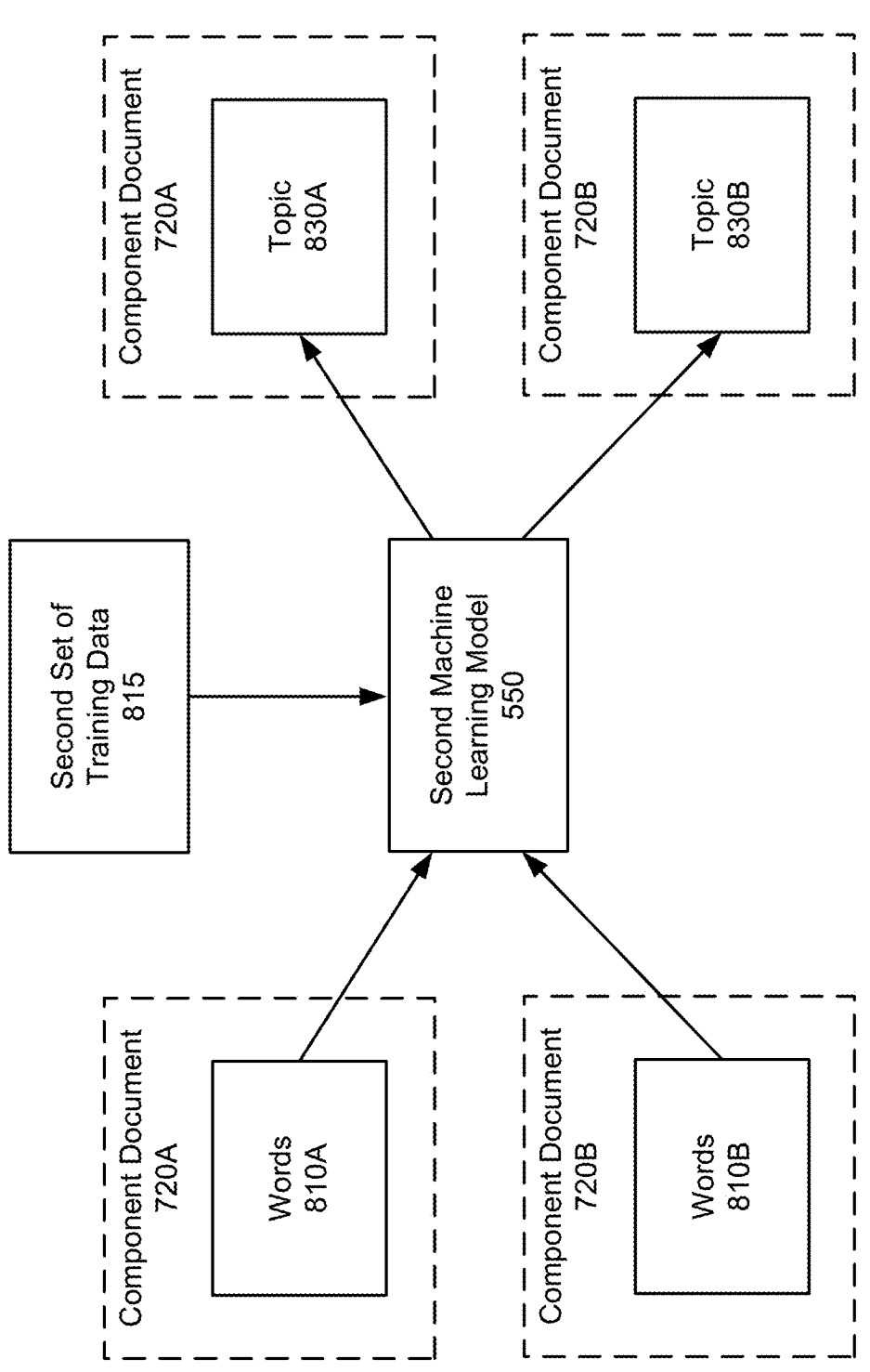
FIG. 8 is a process flow diagram for a second portion of the ensemble machine learning model, according to an example embodiment.

FIG. 8 is a process flow diagram for a second portion of the ensemble machine learning model, according to an example embodiment. The second portion of the ensemble machine learning model is responsible for labeling each component document of the document package with a corresponding document topic. For example, the identified component documents 720 from the first portion of the ensemble machine learning model are provided as inputs into the second portion. Specifically, the words 810 of each identified component document 720 are input into the second machine learning model 550. The words 810 were previously identified by the first portion of the ensemble machine learning model, specifically by the character identification engine 520. The second machine learning model 550 determines a document topic for each component document 720A, 720B based on the words 810A and 810B, respectively. For example, based on how frequently certain words 810A are used in a component document 720A, the second machine learning model 550 identifies a document topic 830A for the component document 720A.

The second machine learning model 550 is trained to identify a document topic for each component document

720A, 720B by inputting a second set of training data 815. The second set of training data 815 may include a plurality of component documents each labeled with a set of word counts and a document topic. The second machine learning model 550 learns to associate certain frequently used words (based on the set of word counts) with certain document topics. In some embodiments, the second machine learning model 550 learns to associate certain combinations of frequently used words with certain document topics. During operation, the second machine learning model 550 may output one or more probabilities the component document 720A is associated with one or more document topics where a probability corresponds to a document topic. The document topic 830A with a highest probability or a probability greater than a threshold probability is the document topic 830A determined by the electronic document system 110 to correspond to the component document 720A. Thus, the document topic 830B has the highest probability or is greater than the threshold probability and corresponds to the component document 720B.

Figure 9:
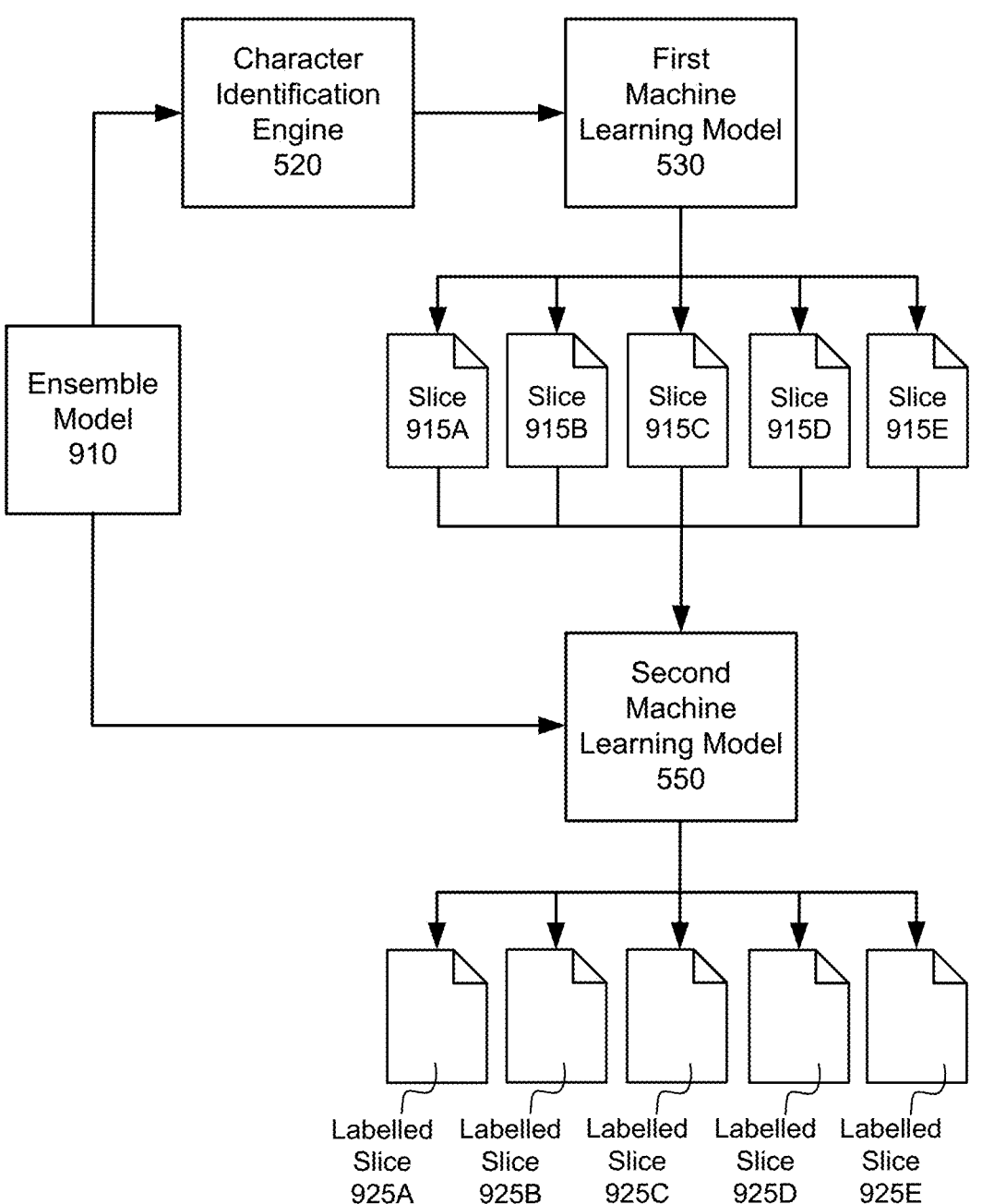
FIG. 9 is a process flow diagram for an ensemble machine learning model, according to an example embodiment.

FIG. 9 is a process flow diagram for an ensemble machine learning model, according to an example embodiment. The ensemble machine learning model 910 performs the splitting of a document package into individual component documents (or slices) and the labeling of each individual component document with its document topic. The ensemble model 910 includes two paths or portions as described above with reference to FIGS. 7 and 8. The first portion including the character identification engine 520 and the first machine learning model 530. The output of the first machine learning model 530 (e.g., one or more identified pages of a document package having a predefined property) provides a means for partitioning the document package into unique individual slices (or component documents) 915A-915E. The slices 915A-915E including the extracted words for each slice 915A, 915B, 915C, 915D, and 915E are fed into the second machine learning model 550. The second machine learning model is included in the second portion of the ensemble machine learning model 910. The second machine learning model 550 identifies a document topic for each slice 915A, 915B, 915C, 915D, and 915E. The identified component documents and corresponding document topics are provided to the UI module 230 for display to a user as labeled slices 925A-925E.

Figure 10A:
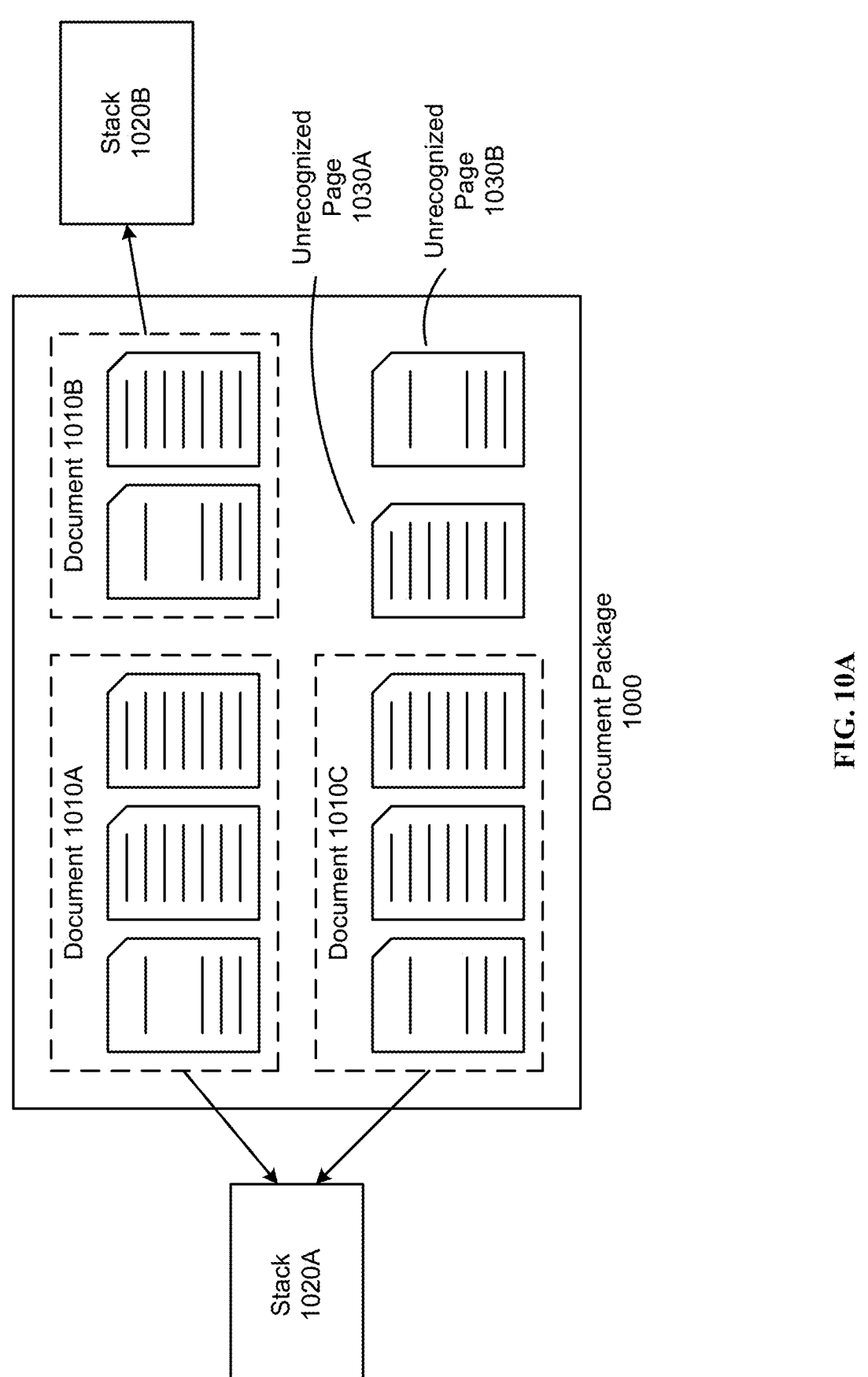
FIG. 10A illustrates an example document package with unrecognized pages, according to an example embodiment.

Example Processes for Splitting Documents Using the Heuristics-Based Approach FIG. 10A illustrates an example document package with unrecognized pages, according to an example embodiment. The document package 1000 of FIG. 10A includes documents 1010 (e.g., a document 1010A, a document 1010B, and a document 1010C), stacks 1020 (e.g., a stack 1020A and a stack 1020B), and unrecognized pages 1030 (e.g., an unrecognized page 1030A and an unrecognized page 1030B). Each document 1010 in the document package 1000 includes a set of pages the package intake module 240 associated with each other and with a document type (for example, based on a document identification rule of a package template 410, as described above). Similarly, each document 1010 is associated with a stack 1020 (also defined by the package template 410). However, in this instance, the automatic processes of the package intake module 240 failed to recognize/associate with a document 1010 the unrecognized pages 1030. At this point, the unrecognized page module 340 can solicit input from the importing user 130 to resolve the unrecognized pages 1030.

Figure 10B:
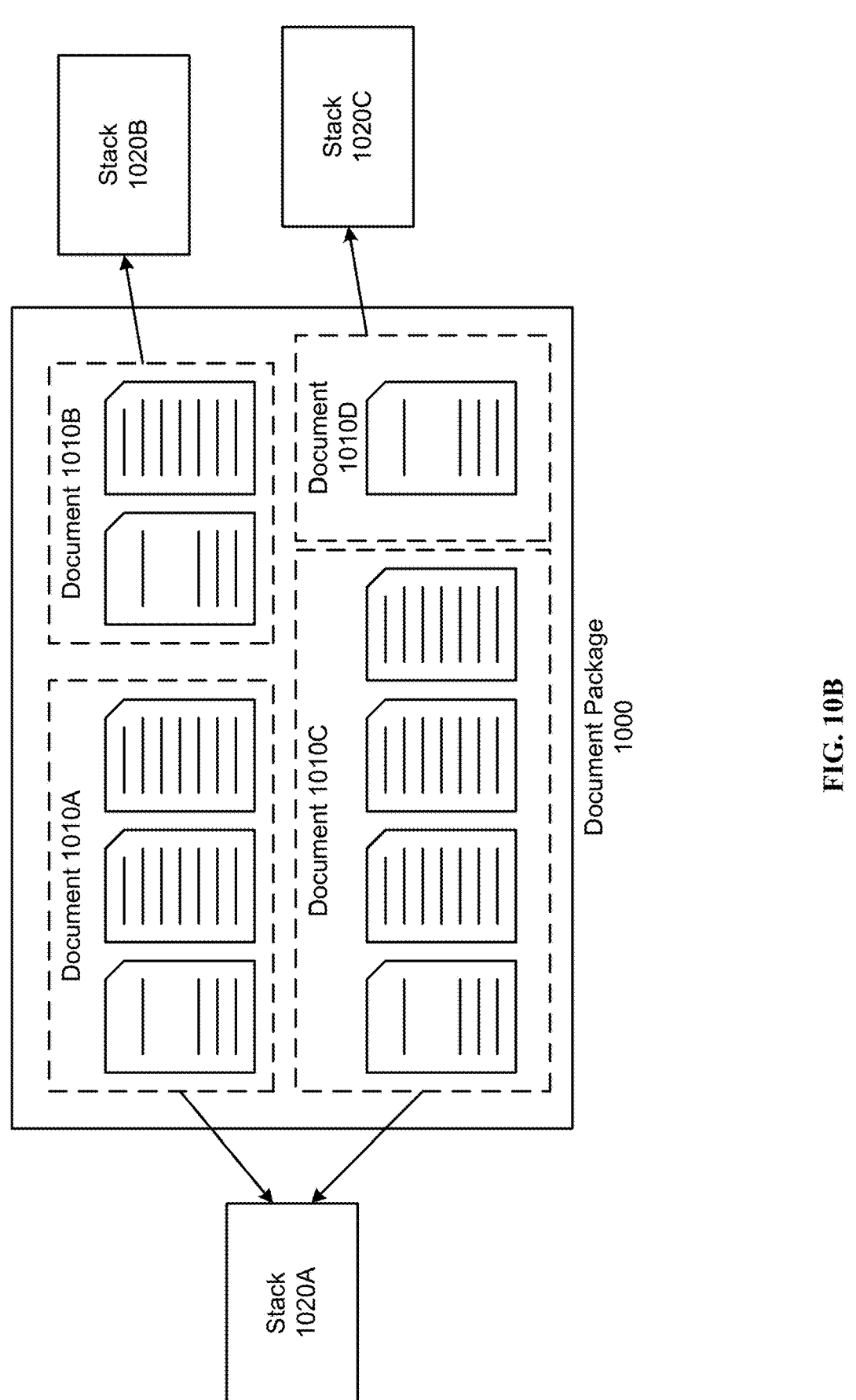
FIG. 10B illustrates the example document package of FIG. 10A with the unrecognized pages resolved.

FIG. 10B illustrates the example document package of FIG. 10A with the unrecognized pages resolved. FIG. 10B depicts the document package 1000 of FIG. 10A after the importing user 130 assigned the unrecognized pages 1030 to documents. In this case, the unrecognized page 1030A has been assigned to the end of existing document 1010C and unrecognized page 1030B was associated with a new document 1010D and stack 1020C. Now that all unrecognized pages have been accounted for, the package intake module 240 can proceed to performing stack actions and otherwise processing the documents 1010.

Figure 11:
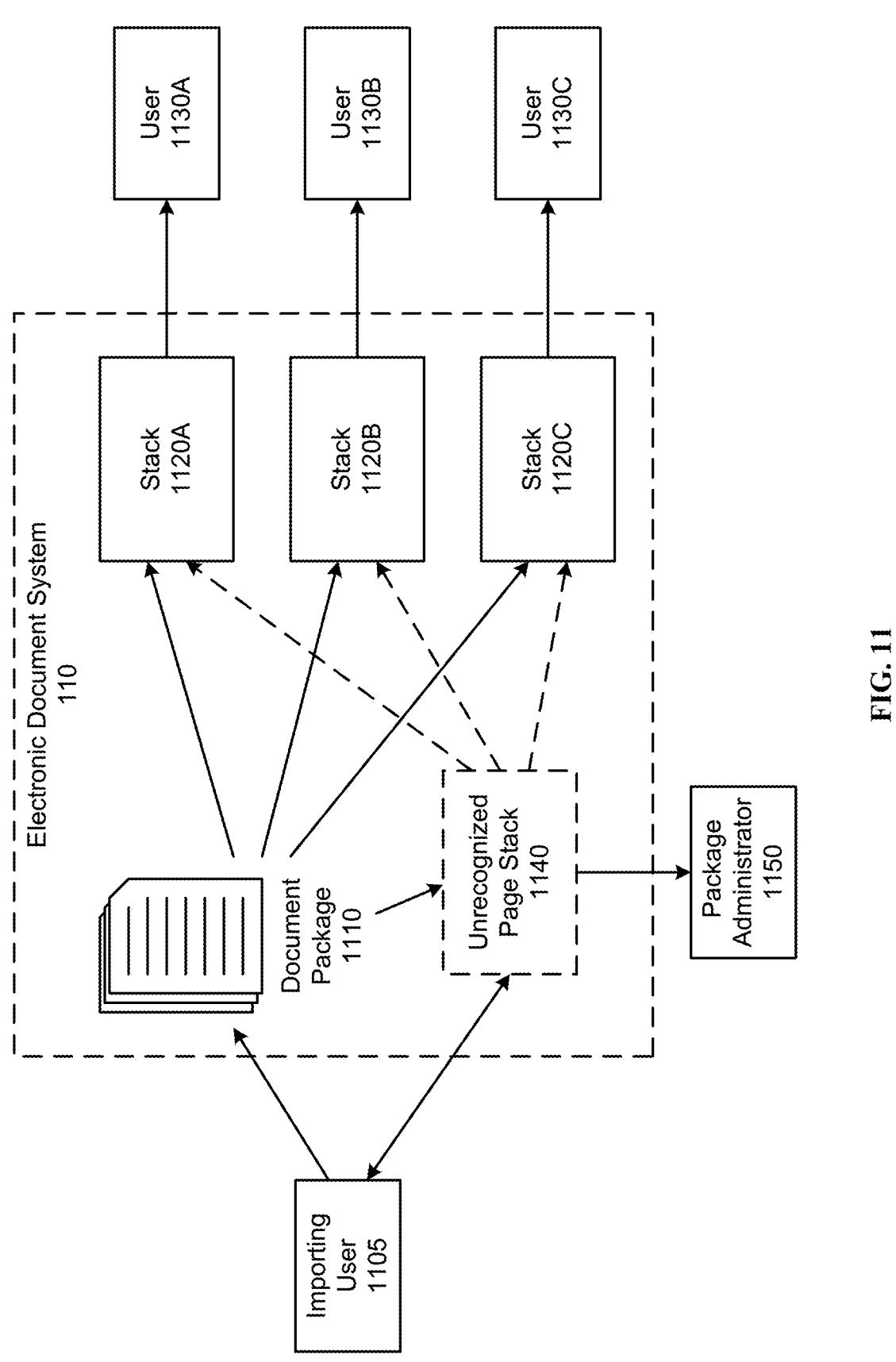
FIG. 11 illustrates splitting an example document package into document stacks, according to an example embodiment.

FIG. 11 illustrates splitting an example document package into document stacks, according to an example embodiment. In the embodiment of FIG. 11, the electronic document system 110 receives a document package 1110 associated with an importing user 1105. The electronic document system 110 then recognizes one or more component documents within the document package 1110 (for example, using a package template the importing user 1105 assigns to the document package 1110) where each component document is associated with pages of the document package 1110 identified by the electronic document system 110 as being part of that component document (for example, using document identification rules of the associated package template). The electronic document system 110 may then split the document package 1110 into stacks 1120 (e.g., a stack 1120A, a stack 1120B, and a stack 1120C), with each stack 1120 being assigned a subset of the component documents of the document package 1110 (as described above, one component document can be assigned to multiple stacks 1120 depending on the embodiment).

In some instances, the electronic document system 110 may fail to fully recognize every page of the document package 1110, for example, there may be additional or unexpected documents included in the document package 1110 (or new formatting on an expected document) that are not accounted for in the package template the electronic document system 110 uses to recognize individual documents. These unrecognized pages that were not initially assigned to a component document can be placed in the temporary unrecognized page stack 1140. The importing user 1105 (or other authorized user 130) can then manually assign unrecognized pages in the unrecognized page stack 1140 to existing or new component documents and/or stacks 1120. As described above, the unrecognized page stack 1140 and any changes made by the importing user 1105 are logged and sent to a package administrator 1150 of the package template used for the document package 1110. The package administrator 1150 or electronic document system 110 can then use this data (aggregated with data from other document packages) to update the package template.

After each page of the document package 1110 is assigned to a component document and stack 1120 (either automatically by the package intake module 240 or through the unrecognized page stack 1140) the electronic document system 110 can perform one or more stack actions on each of the stacks 1120, such as transmitting the stacks 1120 to users 1130 (e.g., by transmitting the stack 1120A to user 1130A), making component documents of the stack 1120 accessible to a user 1130 in the electronic document system 110 (e.g., making component documents of the stack 1120B accessible to user 1130B), or the like.

Figure 12:
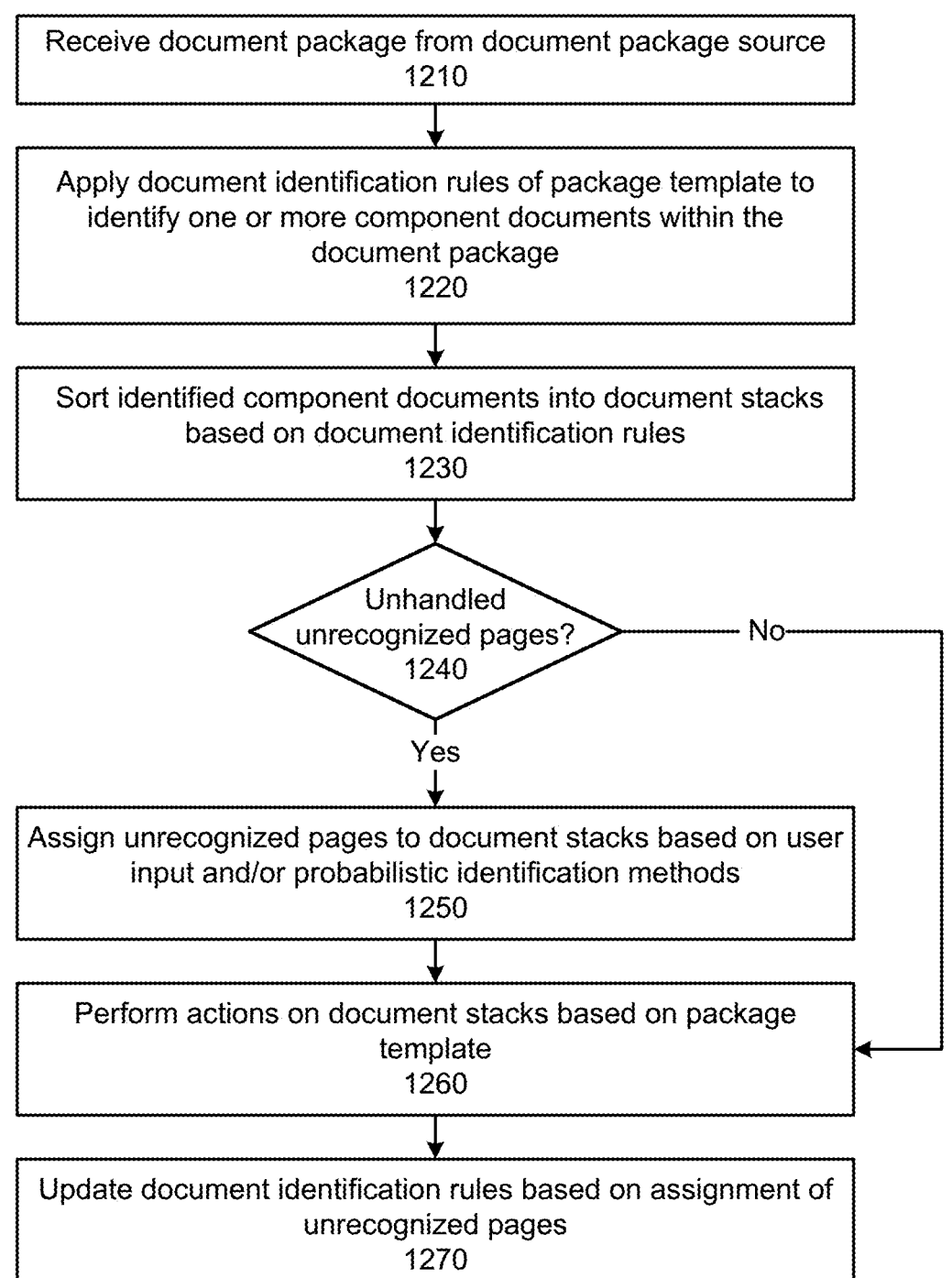
FIG. 12 is a flowchart illustrating an example process for splitting a document package into document stacks, according to an example embodiment.

FIG. 12 is a flowchart illustrating an example process for splitting a document package into document stacks, according to an example embodiment. The process 1200 of FIG. 12 begins when the electronic document system 110 receives 1210 a document package from a document package source (e.g., from the document package source 140 or another user 130). Then, the electronic document system 110 applies 1220 one or more sets of document identification rules 430 to the document package to identify one or more documents within the document package. As described above, the document identification rules can be contained within a package template 410 associated with a category of document package, document package source, or the like. Once identified, the electronic document system 110 sorts 1230 the identified component documents into document stacks based on the document identification rule for each component document.

After the initial automatic sort process (based on the document identification rules) is complete, the electronic document system 110 checks 1240 for the presence of any unhandled unrecognized pages within the document package. If there are one or more unrecognized pages, the electronic document system 110 assigns 1250 the unrecognized pages to documents and document stacks based on user input (a manual assignment) and/or a supplementary probabilistic identification method (for example, a machine learning model trained using previous manual assignments of unrecognized pages associated with a package template). As described above, the electronic document system 110 may also handle unrecognized pages by assigning default stack actions to the set of unrecognized pages in a document package. When no other unrecognized pages within the document package have been identified or the unrecognized pages have been handled, the electronic document system 110 proceeds to perform 1260 one or more actions on the component documents of each document stack (as laid out in the package template). Optionally, a package administrator of the package template can update 1270 the document identification rules of the package template based on the assignments of any identified unrecognized pages.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, comprising:
receiving a document package from a document package source, the document package comprising a set of pages for a set of component documents, wherein a component document of the set of component documents is prepared for a digital signature;
identifying a subset of pages from the set of pages for a component document of the set of component documents using a first machine learning model;
identifying a document topic for the component document using a second machine learning model; and
presenting the component document and corresponding document topic on a user interface of an electronic display.

2. The method of claim 1, comprising:
determining a presence of an unrecognized page from the set of pages of the document package;
determining the unrecognized page is for the component document using a third machine learning model; and
assigning the unrecognized page to the component document.

3. The method of claim 1, comprising:
determining a presence of an unrecognized page from the set of pages of the document package;
determining the unrecognized page is for the component document based on assignment information; and
assigning the unrecognized page to the component document.

4. The method of claim 1, comprising retrieving the document identification rules from a package template associated with a category for the document package.

5. The method of claim 1, comprising performing actions on the document stacks based on a package template associated with a category for the document package.

6. The method of claim 1, comprising updating the document identification rules based on the assignment of the unrecognized page to the identified document stack.

7. A non-transitory computer-readable storage medium storing executable instructions that, when executed by a hardware processor, cause the hardware processor to perform operations comprising:
receive a document package from a document package source, the document package comprising a set of pages for a set of component documents, wherein a component document of the set of component documents is prepared for a digital signature;
identify a subset of pages from the set of pages for a component document of the set of component documents using a first machine learning model;
identify a document topic for the component document using a second machine learning model; and
present the component document and corresponding document topic on a user interface of an electronic display.

8. The computer-readable storage medium of claim 7, comprising instructions that, when executed by the hardware processor, cause the hardware processor to perform operations comprising:
determine a presence of an unrecognized page from the set of pages of the document package;
determine the unrecognized page is for the component document using a third machine learning model; and
assign the unrecognized page to the component document.

9. The computer-readable storage medium of claim 7, comprising instructions that, when executed by the hardware processor, cause the hardware processor to perform operations comprising:
determine a presence of an unrecognized page from the set of pages of the document package;
determine the unrecognized page is for the component document based on assignment information; and
assign the unrecognized page to the component document.

10. The computer-readable storage medium of claim 7, comprising instructions that, when executed by the hardware processor, cause the hardware processor to perform operations comprising retrieve the document identification rules from a package template associated with a category for the document package.

11. The computer-readable storage medium of claim 7, comprising instructions that, when executed by the hardware processor, cause the hardware processor to perform actions on the document stacks based on a package template associated with a category for the document package.

12. The computer-readable storage medium of claim 7, comprising instructions that, when executed by the hardware processor, cause the hardware processor to perform operations comprising update the document identification rules based on the assignment of the unrecognized page to the identified document stack.

13. An apparatus, comprising:
circuitry; and
memory operably coupled to the circuitry, the memory to store instructions that, when executed by the circuitry, causes the circuitry to:
receive a document package from a document package source, the document package comprising a set of pages for a set of component documents, wherein a component document of the set of component documents is prepared for a digital signature;

identify a subset of pages from the set of pages for a component document of the set of component documents using a first machine learning model;

identify a document topic for the component document using a second machine learning model; and present the component document and corresponding document topic on a user interface of an electronic display.

14. The apparatus of claim 13, the circuitry to:

determine a presence of an unrecognized page from the set of pages of the document package;

determine the unrecognized page is for the component document using a third machine learning model; and assign the unrecognized page to the component document.

15. The apparatus of claim 13, the circuitry to:

determine a presence of an unrecognized page from the set of pages of the document package;

determine the unrecognized page is for the component document based on assignment information; and assign the unrecognized page to the component document.

16. The apparatus of claim 13, the circuitry to retrieve the document identification rules from a package template associated with a category for the document package.

17. The apparatus of claim 13, the circuitry to perform actions on the document stacks based on a package template associated with a category for the document package.

\* \* \* \* \*